US012677214B2

(12) United States Patent
Khodapanah et al.

(10) Patent No.: US 12,677,214 B2
(45) Date of Patent: Jul. 7, 2026

(54) GENERATING CELL CONFIGURATION INFORMATION

(71) Applicant: Nokia Technologies Oy, Espoo (FI)

(72) Inventors: Behnam Khodapanah, Munich (DE);
Halit Murat Gürsu, Munich (DE);
Ahmad Awada, Munich (DE);
Panagiotis Spapis, Munich (DE);
Srinivasan Selvaganapathy, Bangalore (IN); Umur Karabulut, Munich (DE);
Jedrzej Stanczak, Wroclaw (PL)

(73) Assignee: NOKIA TECHNOLOGIES OY,
Espoo (FI)

( * ) Notice: Subject to any disclaimer, the term of this patent is extended or adjusted under 35 U.S.C. 154(b) by 293 days.

(21) Appl. No.: 18/441,565

(22) Filed: Apr. 25, 2024

(65) Prior Publication Data

US 2024/0381242 A1     Nov. 14, 2024

(51) Int. Cl.
| | |
|---|---|
| *H04L 12/00* | (2006.01) |
| *H04W 28/02* | (2009.01) |
| *H04W 48/20* | (2009.01) |

(52) U.S. Cl.
CPC ....... *H04W 48/20* (2013.01); *H04W 28/0252* (2013.01)

(58) Field of Classification Search
CPC ............. H04W 48/20; H04W 28/0252; H04W 36/0069; H04W 76/27; H04W 36/362; H04W 24/10; H04W 76/15; H04W 16/02
(Continued)

(56) References Cited

U.S. PATENT DOCUMENTS

| | | | | |
|---|---|---|---|---|
| 10,715,951 B1 * | 7/2020 | Ratasuk | ................ | H04W 24/10 |
| 2008/0267161 A1 * | 10/2008 | Bertrand | ............... | H04W 16/02 |
| | | | | 370/347 |

(Continued)

FOREIGN PATENT DOCUMENTS

| | | | | | |
|---|---|---|---|---|---|
| CA | 3238866 A1 | * | 11/2023 | ............ | H04W 76/19 |
| CN | 102457920 B | * | 3/2016 | ............ | H04W 24/02 |
| WO | WO-2019098914 A1 | * | 5/2019 | ............ | H04W 24/02 |

*Primary Examiner* — Frantz Coby
(74) *Attorney, Agent, or Firm* — Carter, DeLuca & Farrell LLP

(57) ABSTRACT

A user equipment of a telecommunications network comprising: at least one processor; and at least one memory storing instructions that, when executed by the at least one processor, cause the user equipment at least to: establish a connection between the user equipment and a first network node of the radio access network, the first network node supporting a first cell, derive in the user equipment a reference configuration relating to the first cell; wherein the reference configuration includes information related to a first bearer configuration; receive in the user equipment a target configuration related to a cell change from the first cell towards a second cell, wherein the target configuration includes information related to a target bearer configuration; and in response to an update of the first bearer configuration to an updated first bearer configuration, derive in the user equipment a related updated reference configuration and receiving in the user equipment a delta-over-target configuration, the delta-over-target configuration including information related to differences between an updated target bearer configuration and the target bearer configuration.

25 Claims, 13 Drawing Sheets

| | Source Full Config | Target Full Config | Delta over Source | Delta over Target (compare full configs) | Delta over Target (compare delta configs) |
|---|---|---|---|---|---|
| Before the update t=2 | PCI 1<br>DRB 1<br>Qos Flow 1 maps to DRB1<br>Qos Flow 1 maps to DRB2<br>TCI-state 1-2-3 | PCI 2<br>DRB 1<br>Qos Flow 1 maps to DRB1<br>TCI-state 4-5-6 | PCI 2<br>TCI-state 4-5-6<br>Release QoS Flow 2<br>Release DRB2 | Not Applicable | Not Applicable |

| | Source Full Config | Target Full Config | Delta over Source | Delta over Target (compare full configs) | Delta over Target (compare delta configs) |
|---|---|---|---|---|---|
| After the update t=2 | PCI 1<br>DRB1<br>DRB2<br>DRB3<br>QoS Flow 1 maps to DRB1<br>QoS Flow 2 maps to DRB2<br>QoS Flow 3 maps to DRB3<br>TCI-state 1-2-3 | PCI 2<br>DRB 1<br>DRB 3<br>QoS Flow 1 maps to DRB1<br>QoS Flow 3 maps to DRB3<br>TCI-state 4-5-6 | PCI 2<br>TCI-state 4-5-6<br>Release QoS Flow 2<br>Release DRB2 | DRB 3<br>QoS Flow 3 maps to DRB3 | Ø |

| | Source Full Config | Target Full Config | Delta over Source | Delta over Target (compare full configs) | Delta over Target (compare delta configs) |
|---|---|---|---|---|---|
| After the update t=3 | PCI 1<br>DRB1<br>DRB2<br>DRB3<br>QoS Flow 1 maps to DRB1<br>QoS Flow 2 maps to DRB2<br>QoS Flow 3 maps to DRB3<br>TCI-state 1-2-3 | PCI 2<br>DRB 1<br>DRB 3<br>QoS Flow 1 maps to DRB1<br>QoS Flow 3 maps to DRB3<br>TCI-state 4-5-6 | PCI 2<br>TCI-state 4-5-6 | Ø | Remove Release QoS Flow 2<br>Remove Release DRB2 |

(58) Field of Classification Search
USPC ........................................ 370/230, 255, 347
See application file for complete search history.

(56) References Cited

U.S. PATENT DOCUMENTS

2012/0082064 A1 * 4/2012 Awoniyi ........... H04W 52/0206
370/255
2015/0148038 A1 * 5/2015 Griot .................... H04W 76/15
455/435.2

* cited by examiner

| Source Full Config | Target Full Config | Delta over Source | Delta over Target (compare full configs) | Delta over Target (compare delta configs) |
|---|---|---|---|---|
| Before the update t=2 | | | | |
| PCI 1<br>DRB 1<br>QoS Flow 1 maps to DRB1<br>QoS Flow 1 maps to DRB2<br>TCI-state 1-2-3 | PCI 2<br>DRB 1<br>QoS Flow 1 maps to DRB1<br>TCI-state 4-5-6 | PCI 2<br>TCI-state 4-5-6<br>Release QoS Flow 2<br>Release DRB2 | Not Applicable | Not Applicable |
| After the update t=2 | | | | |
| PCI 1<br>DRB1<br>DRB2<br>DRB3<br>QoS Flow 1 maps to DRB1<br>QoS Flow 2 maps to DRB2<br>QoS Flow 3 maps to DRB3<br>TCI-state 1-2-3 | PCI 2<br>DRB 1<br>DRB 3<br>QoS Flow 1 maps to DRB1<br>QoS Flow 3 maps to DRB3<br>TCI-state 4-5-6 | PCI 2<br>TCI-state 4-5-6<br>Release QoS Flow 2<br>Release DRB2 | DRB 3<br>QoS Flow 3 maps to DRB3 | ∅ |
| After the update t=3 | | | | |
| PCI 1<br>DRB1<br>DRB2<br>DRB3<br>QoS Flow 1 maps to DRB1<br>QoS Flow 2 maps to DRB2<br>QoS Flow 3 maps to DRB3<br>TCI-state 1-2-3 | PCI 2<br>DRB 1<br>DRB3<br>QoS Flow 1 maps to DRB1<br>QoS Flow 3 maps to DRB3<br>TCI-state 4-5-6 | PCI 2<br>TCI-state 4-5-6 | ∅ | Remove Release QoS Flow 2<br>Remove Release DRB2 |

FIG. 7

GENERATING CELL CONFIGURATION INFORMATION

TECHNOLOGICAL FIELD

Various example embodiments relate to generating cell configuration information in a wireless telecommunications network.

BACKGROUND

In some wireless telecommunications networks, a cell change is facilitated by having configuration information of the candidate or target cell(s) that are to be used for the cell change. Although techniques exist for providing such configuration information, they each have their own shortcomings. Accordingly, it is desired to provide an improved technique.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various embodiments of the invention.

According to various, but not necessarily all, example embodiments of the invention there is provided a user equipment of a telecommunications network comprising: at least one processor; and at least one memory storing instructions that, when executed by the at least one processor, cause the user equipment at least to: establish a connection between the user equipment and a first network node of the radio access network, the first network node supporting a first cell, derive in the user equipment a reference configuration relating to the first cell; wherein the reference configuration includes information related to a first bearer configuration; receive in the user equipment a target configuration related to a cell change from the first cell towards a second cell, wherein the target configuration includes information related to a target bearer configuration; and in response to an update of the first bearer configuration to an updated first bearer configuration, derive in the user equipment a related updated reference configuration and receiving in the user equipment a delta-over-target configuration, the delta-over-target configuration including information related to differences between an updated target bearer configuration and the target bearer configuration.

The instructions may cause the user equipment at least to: receive an indication in the user equipment identifying the delta-over-target configuration.

The indication may comprise a flag.

The instructions may cause the user equipment at least to: store in the user equipment the updated reference configuration, the target configuration and the delta-over-target configuration.

The reference configuration may relate to a full configuration of the first cell at a first time when establishing connection with the first cell or a predetermined configuration known to the first network node and a second network node supporting the second cell. In other words, the reference configuration can be the first cell configuration or a template configuration that is agreed upon by the first node and the second node.

The updated reference configuration may relate to an updated full configuration of the first cell at a second time, subsequent to the first time, in response to the update of the first bearer configuration.

The instructions may cause the user equipment at least to: in response to a further update of the first bearer configuration of the first cell to a further updated first bearer configuration, derive in the user equipment a related updated reference configuration and receiving in the user equipment an updated delta-over-target configuration, the updated delta-over-target configuration including information related to differences between the further updated target bearer configuration and the target bearer configuration.

The instructions may cause the user equipment at least to: store the updated delta-over-target configuration as the delta-over-target configuration. In other words, the latest received updated delta-over-target configuration overwrites or replaces the previous delta-over-target configuration.

The target configuration may comprise a full configuration of the second cell.

The instructions may cause the user equipment at least to: determine a full configuration for performing the cell change towards the second cell by applying the delta-over-target configuration to the target configuration.

The target configuration may comprise a delta-over-reference configuration, the delta-over-reference configuration including information related to differences between the target bearer configuration and the first bearer configuration.

The instructions may cause the user equipment at least to: determine a full configuration for performing the cell change towards the second cell by applying the delta-over-target configuration to the delta-over-reference configuration and to the reference configuration.

The instructions may cause the user equipment at least to: perform the cell change using the full configuration.

The instructions may cause the user equipment at least to: receive in the user equipment one or more further target configurations related to a cell change from the first cell towards one or more further cells, wherein the target configuration includes information related to a target bearer configuration of those further cells; and in response to an update of the first bearer configuration to the updated first bearer configuration, receive in the user equipment a delta-over-target configuration for the one or more cells, the delta-over-target configuration including information related to between the updated further target bearer configuration and the target bearer configuration.

The instructions cause the user equipment at least to: receive the reference configuration, the target configuration, the delta-over-target configuration and/or the updated delta-over-target second delta configuration using RRC signalling.

The first bearer configuration, the target bearer configuration, the updated target bearer configuration and/or the further updated bearer first bearer configuration may comprise information related to at least one of the following parameters: Data Radio Bearer parameters, Quality of Service parameters, Quality of Service flow parameters, Protocol Data Unit session parameter and/or other dynamically changing parameters, and the like.

The first network node may comprise at least one of or supports functionality of at least one of: a base station, a 5G gNB, a Centralised Unit, a Distributed Unit, a secondary node, a source node or a source secondary node.

The user equipment may support dual connectivity to a master node and a secondary node.

The first cell may be at least one of a source cell, a primary cell of a first cell group or primary cell of a secondary cell group supported by a source secondary node.

The second network node may comprise at least one of or supports functionality of at least one of: a base station, a 5G gNB, a Centralised Unit, a Distributed Unit, a secondary node, a source node or a source secondary node.

The second cell may be at least one of a target cell, a primary cell of a first cell group or primary cell of a secondary cell group supported by a first target secondary node.

The cell change from the first cell towards the second cell may occur as a result of Conditional Handover, Conditional PSCell Change and/or Lower Layer triggered Mobility.

According to various, but not necessarily all, example embodiments of the invention there is provided a user equipment of a telecommunications network comprising: means for establishing a connection between the user equipment and a first network node of the radio access network, the first network node supporting a first cell; means for deriving in the user equipment a reference configuration relating to the first cell, wherein the reference configuration includes information related to a first bearer configuration; means for receiving in the user equipment a target configuration related to a cell change from the first cell towards a second cell, wherein the target configuration includes information related to a target bearer configuration; and means for deriving in the user equipment, in response to an update of the first bearer configuration to an updated first bearer configuration, a related updated reference configuration and receiving in the user equipment a delta-over-target configuration, the delta-over-target configuration including information related to differences between an updated target bearer configuration and the target bearer configuration.

The user equipment may have means for performing the features of the instruction set out above.

According to various, but not necessarily all, example embodiments of the invention there is provided a method for supporting cell change for a user equipment supporting connectivity towards a radio access network, the method comprising: establishing a connection between the user equipment and a first network node of the radio access network, the first network node supporting a first cell, deriving in the user equipment a reference configuration relating to the first cell; wherein the reference configuration includes information related to a first bearer configuration; receiving in the user equipment a target configuration related to a cell change from the first cell towards a second cell, wherein the target configuration includes information related to a target bearer configuration; and in response to an update of the first bearer configuration to an updated first bearer configuration, deriving in the user equipment a related updated reference configuration and receiving in the user equipment a delta-over-target configuration, the delta-over-target configuration including information related to differences between an updated target bearer configuration and the target bearer configuration.

The method may comprise receiving an indication in the user equipment identifying the delta-over-target configuration.

The indication may comprise a flag.

The method may comprise storing in the user equipment the updated reference configuration, the target configuration and the delta-over-target configuration.

The reference configuration may relate to a full configuration of the first cell at a first time when establishing connection with the first cell or a predetermined configuration known to the first network node and a second network node supporting the second cell.

The updated reference configuration may relate to an updated full configuration of the first cell at a second time, subsequent to the first time, in response to the update of the first bearer configuration.

The method may comprise, in response to a further update of the first bearer configuration of the first cell to a further updated first bearer configuration, deriving in the user equipment a related updated reference configuration and receiving in the user equipment an updated delta-over-target configuration, the updated delta-over-target configuration including information related to differences between the further updated target bearer configuration and the target bearer configuration.

The method may comprise storing the updated delta-over-target configuration as the delta-over-target configuration. In other words, the latest received updated delta-over-target configuration overwrites or replaces the previous delta-over-target configuration.

The target configuration may comprise a full configuration of the second cell.

The method may comprise determining a full configuration for performing the cell change towards the second cell by applying the delta-over-target configuration to the target configuration.

The target configuration may comprise a delta-over-reference configuration, the delta-over-reference configuration including information related to differences between the target bearer configuration and the first bearer configuration.

The method may comprise determining a full configuration for performing the cell change towards the second cell by applying the delta-over-target configuration to the delta-over-reference configuration and to the reference configuration.

The method may comprise performing the cell change using the full configuration.

The method may comprise receiving in the user equipment one or more further target configurations related to a cell change from the first cell towards one or more further cells, wherein the target configuration includes information related to a target bearer configuration of those further cells; and in response to an update of the first bearer configuration to the updated first bearer configuration, receiving in the user equipment a delta-over-target configuration for the one or more cells, the delta-over-target configuration including information related to between the updated further target bearer configuration and the target bearer configuration.

The method may comprise receiving the reference configuration, the target configuration, the delta-over-target configuration and/or the updated delta-over-target second delta configuration using RRC signalling.

The first bearer configuration, the target bearer configuration, the updated target bearer configuration and/or the further updated bearer first bearer configuration may comprise information related to at least one of the following parameters: Data Radio Bearer parameters, Quality of Service parameters, Quality of Service flow parameters, Protocol Data Unit session parameter and/or other dynamically changing parameters, and the like.

The first network node may comprise at least one of or supports functionality of at least one of: a base station, a 5G gNB, a Centralised Unit, a Distributed Unit, a secondary node, a source node or a source secondary node.

The user equipment may support dual connectivity to a master node and a secondary node.

The first cell may be at least one of a source cell, a primary cell of a first cell group or primary cell of a secondary cell group supported by a source secondary node.

The second network node may comprise at least one of or supports functionality of at least one of: a base station, a 5G gNB, a Centralised Unit, a Distributed Unit, a secondary node, a source node or a source secondary node.

The second cell may be at least one of a target cell, a primary cell of a first cell group or primary cell of a secondary cell group supported by a first target secondary node.

The cell change from the first cell towards the second cell may occur as a result of Conditional Handover, Conditional PSCell Change and/or Lower Layer triggered Mobility.

According to various, but not necessarily all, example embodiments of the invention there is provided a non-transitory computer readable medium comprising program instructions stored thereon for performing at least the following: establishing a connection between the user equipment and a first network node of the radio access network, the first network node supporting a first cell, deriving in the user equipment a reference configuration relating to the first cell; wherein the reference configuration includes information related to a first bearer configuration; receiving in the user equipment a target configuration related to a cell change from the first cell towards a second cell, wherein the target configuration includes information related to a target bearer configuration; and in response to an update of the first bearer configuration to an updated first bearer configuration, deriving in the user equipment a related updated reference configuration and receiving in the user equipment a delta-over-target configuration, the delta-over-target configuration including information related to differences between an updated target bearer configuration and the target bearer configuration.

The program instructions may be for performing the method steps set out above.

According to various, but not necessarily all, example embodiments of the invention there is provided a network node of a telecommunications network comprising: at least one processor; and at least one memory storing instructions that, when executed by the at least one processor, cause the user equipment at least to: transmit, from a first network node supporting a first cell to the user equipment, a target configuration related to a cell change from the first cell towards a second cell, wherein the target configuration includes information related to a target bearer configuration; and in response to an update of a first bearer configuration of the first cell to an updated first bearer configuration transmit, from the first network node to the user equipment, a delta-over-target configuration, the delta-over-target configuration including information related to between an updated bearer configuration and the target bearer configuration.

The instructions may cause the network node at least to: transmit to the user equipment an indication identifying the delta-over-target configuration.

The indication may comprise a flag.

The instructions may cause the network node at least to: transmit, from the first network node to a second network node supporting the second cell, an indication of the update of the first bearer configuration.

The indication of the update of the first bearer configuration may identify to the second node that the first bearer configuration is to be stored by the second node.

The instructions may cause the network node at least to: prior to transmitting the target configuration, receive an indication that the target configuration is to be stored by the second node.

The instructions may cause the network node at least to: store the target configuration in the second node.

The target configuration may be a full configuration of the second node or a delta-over-source configuration. In other words, the target configuration may be the full configuration of the second node or the difference in configuration between the second node and the first node.

The instructions may cause the network node at least to perform one of: receive, at the first network node from the second network node, the delta-over-target configuration; and receive, at the first network node from the second network node, a full configuration of the second cell and deriving the delta-over-target configuration.

The instructions may cause the network node at least to: when the delta-over-target configuration contains no differences, skip transmission to the user equipment.

The instructions may cause the network node at least to: in response to a further update of the first bearer configuration to a further updated first bearer configuration, transmit, from the first network node to the user equipment, an updated delta-over-target configuration, the updated delta-over-target configuration including information related to differences between the further updated target bearer configuration and the target bearer configuration.

The instructions may cause the network node at least to: transmit, from the first network node to the second network node supporting the second cell, an indication of the further update of the first bearer configuration.

The instructions may cause the network node at least to perform one of: receive, at the first network node from the second network node, the updated delta-over-target configuration; and receive, at the first network node from the second network node, a full configuration of the second cell and deriving the updated delta-over-target configuration.

The instructions may cause the network node at least to: when the updated delta-over-target configuration contains no differences, skip transmission to the user equipment.

The target configuration may comprise a full configuration of the second cell or a delta-over-reference configuration, the delta-over-reference configuration including information related to identifying differences between the target bearer configuration and the reference first bearer configuration.

When the first network node is a serving distributed unit the instructions may cause the update of the first bearer configuration to be transmitted from its serving central unit to a target distributed which determines an updated bearer configuration and may cause determining in the central unit the delta-over-target configuration for transmission by the serving distributed unit to the user equipment.

The first bearer configuration, the target bearer configuration, the updated target bearer configuration and/or the further updated bearer first bearer configuration may comprise information related to at least one of the following parameters: Data Radio Bearer parameters, Quality of Service parameters, Quality of Service flow parameters, Protocol Data Unit session parameter and/or other dynamically changing parameters, and the like.

The first network node may comprise at least one of or supports functionality of at least one of: a base station, a 5G gNB, a Centralised Unit, a Distributed Unit, a secondary node, a source node or a source secondary node.

The user equipment may support dual connectivity to a master node and a secondary node.

The first cell may be at least one of a source cell, a primary cell of a first cell group or primary cell of a secondary cell group supported by a source secondary node.

The second network node may comprise at least one of or supports functionality of at least one of: a base station, a 5G gNB, a Centralised Unit, a Distributed Unit, a secondary node, a source node or a source secondary node.

The second cell may be at least one of a target cell, a primary cell of a first cell group or primary cell of a secondary group supported by a first target secondary node.

The cell change from the first cell towards the second cell may occur as a result of Conditional Handover, Conditional PSCell Change and/or Lower Layer triggered Mobility.

According to various, but not necessarily all, example embodiments of the invention there is provided a network node of a telecommunications network comprising: means for transmitting, from a first network node supporting a first cell to the user equipment, a target configuration related to a cell change from the first cell towards a second cell, wherein the target configuration includes information related to a target bearer configuration; and means for transmitting from the first network node to the user equipment, in response to an update of a first bearer configuration of the first cell to an updated first bearer configuration transmit, a delta-over-target configuration, the delta-over-target configuration including information related to between an updated bearer configuration and the target bearer configuration.

The network node may have means for performing the features of the instructions set out above.

According to various, but not necessarily all, example embodiments of the invention there is provided a method for supporting cell change for a user equipment supporting connectivity towards a radio access network, the method comprising: transmitting, from a first network node supporting a first cell to the user equipment, a target configuration related to a cell change from the first cell towards a second cell, wherein the target configuration includes information related to a target bearer configuration; in response to an update of a first bearer configuration of the first cell to an updated first bearer configuration transmitting, from the first network node to the user equipment, a delta-over-target configuration, the delta-over-target configuration including information related to between an updated bearer configuration and the target bearer configuration.

The method may further comprise transmitting to the user equipment an indication identifying the delta-over-target configuration.

The indication may comprise a flag.

The method may further comprise transmitting, from the first network node to a second network node supporting the second cell, an indication of the update of the first bearer configuration.

The indication of the update of the first bearer configuration may identify to the second node that the first bearer configuration is to be stored by the second node.

The method may further comprise prior to transmitting the target configuration, receiving an indication that the target configuration is to be stored by the second node.

The method may further comprise storing the target configuration in the second node.

The target configuration may be a full configuration of the second node or a delta-over-source configuration. In other words, the target configuration may be the full configuration of the second node or the difference in configuration between the second node and the first node.

The method may further comprise receiving, at the first network node from the second network node, the delta-over-target configuration; and receiving, at the first network node from the second network node, a full configuration of the second cell and deriving the delta-over-target configuration.

The method may further comprise when the delta-over-target configuration contains no differences, skipping transmission to the user equipment.

The method may further comprise, in response to a further update of the first bearer configuration to a further updated first bearer configuration, transmitting, from the first network node to the user equipment, an updated delta-over-target configuration, the updated delta-over-target configuration including information related to differences between the further updated target bearer configuration and the target bearer configuration.

The method may further comprise transmitting, from the first network node to the second network node supporting the second cell, an indication of the further update of the first bearer configuration.

The method may further comprise one of: receiving, at the first network node from the second network node, the updated delta-over-target configuration; and receiving, at the first network node from the second network node, a full configuration of the second cell and deriving the updated delta-over-target configuration.

The method may further comprise, when the updated delta-over-target configuration contains no differences, skipping transmission to the user equipment.

The target configuration may comprise a full configuration of the second cell or a delta-over-reference configuration, the delta-over-reference configuration including information related to identifying differences between the target bearer configuration and the reference first bearer configuration.

The method may comprise, when the first network node is a serving distributed unit and the update of the first bearer configuration is transmitted from its serving central unit to a target distributed which determines an updated bearer configuration, determining in the central unit the delta-over-target configuration for transmission by the serving distributed unit to the user equipment.

The first bearer configuration, the target bearer configuration, the updated target bearer configuration and/or the further updated bearer first bearer configuration may comprise information related to at least one of the following parameters: Data Radio Bearer parameters, Quality of Service parameters, Quality of Service flow parameters, Protocol Data Unit session parameter and/or other dynamically changing parameters, and the like.

The first network node may comprise at least one of or supports functionality of at least one of: a base station, a 5G gNB, a Centralised Unit, a Distributed Unit, a secondary node, a source node or a source secondary node.

The user equipment may support dual connectivity to a master node and a secondary node.

The first cell may be at least one of a source cell, a primary cell of a first cell group or primary cell of a secondary cell group supported by a source secondary node.

The second network node may comprise at least one of or supports functionality of at least one of: a base station, a 5G gNB, a Centralised Unit, a Distributed Unit, a secondary node, a source node or a source secondary node.

The second cell may be at least one of a target cell, a primary cell of a first cell group or primary cell of a secondary group supported by a first target secondary node.

The cell change from the first cell towards the second cell may occur as a result of Conditional Handover, Conditional PSCell Change and/or Lower Layer triggered Mobility.

According to various, but not necessarily all, example embodiments of the invention there is provided a non-transitory computer readable medium comprising program instructions stored thereon for performing at least the following: transmitting, from a first network node supporting a first cell to the user equipment, a target configuration related to a cell change from the first cell towards a second cell, wherein the target configuration includes information related to a target bearer configuration; in response to an update of a first bearer configuration of the first cell to an updated first bearer configuration transmitting, from the first network node to the user equipment, a delta-over-target configuration, the delta-over-target configuration including information related to between an updated bearer configuration and the target bearer configuration.

The program instructions may be for performing the method steps set out above.

In the apparatus and methods set out above, the first network node may be a source distributed unit or a source gNB.

In the apparatus and methods set out above, the first cell may be a source cell.

In the apparatus and methods set out above, the reference configuration may be a full configuration, such as, for example a source full configuration, a full configuration of source cell, a full_source_t1, a Source Full Config (t=1).

In the apparatus and methods set out above, the bearer configuration may include information related to at least one of the following parameters: DRB, QoS, QoS flow, PDU session, other dynamically changing parameters, etc.

In the apparatus and methods set out above, the second cell may be a target cell, supported by a second network node.

In the apparatus and methods set out above, the second network node may be a target distributed unit or a target gNB.

In the apparatus and methods set out above, the target configuration is a full configuration or a delta configuration such as for example a full configuration of a target cell or a delta configuration (delta over source, related to the difference between a target full configuration and a source full configuration), a target full Configuration, a Delta over Source configuration, delta_source1_t1.

In the apparatus and methods set out above, the updated reference configuration may be a full or a delta configuration such as for example a full configuration of a source cell updated to new parameters, e.g. new DRB, etc., or a delta configuration (delta over source, related to difference between a source full configuration with new DRB and an initial source full configuration with an initial DRB configuration), a source full configuration (t=2), full_source_t2.

In the apparatus and methods set out above, the delta-over-target configuration may be a delta configuration, e.g. delta over target, related to a difference between a target full configuration with new DRB and an initial target full configuration with an initial DRB configuration, delta_target1_t2.

According to various, but not necessarily all, example embodiments of the invention there is provided a non-transitory computer readable medium comprising program instructions stored thereon for causing a user equipment to perform at least the following: establishing a connection between the user equipment and a first network node of the radio access network, the first network node supporting a first cell, deriving in the user equipment a reference configuration relating to the first cell; wherein the reference configuration includes information related to a first bearer configuration; receiving in the user equipment a target configuration related to a cell change from the first cell towards a second cell, wherein the target configuration includes information related to a target bearer configuration; and in response to an update of the first bearer configuration to an updated first bearer configuration, deriving in the user equipment a related updated reference configuration and receiving in the user equipment a delta-over-target configuration, the delta-over-target configuration including information related to differences between an updated target bearer configuration and the target bearer configuration.

The instructions may cause the user equipment to perform the optional features of the method set out above.

According to various, but not necessarily all, example embodiments of the invention there is provided a non-transitory computer readable medium comprising program instructions stored thereon for causing a network node to perform at least the following: transmitting, from a first network node supporting a first cell to the user equipment, a target configuration related to a cell change from the first cell towards a second cell, wherein the target configuration includes information related to a target bearer configuration; in response to an update of a first bearer configuration of the first cell to an updated first bearer configuration transmitting, from the first network node to the user equipment, a delta-over-target configuration, the delta-over-target configuration including information related to between an updated bearer configuration and the target bearer configuration.

The instructions may cause the network node to perform the optional features of the method set out above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 7 illustrates example configurations before and after User Plane Reconfigurations.

DETAILED DESCRIPTION

Figure 1A:
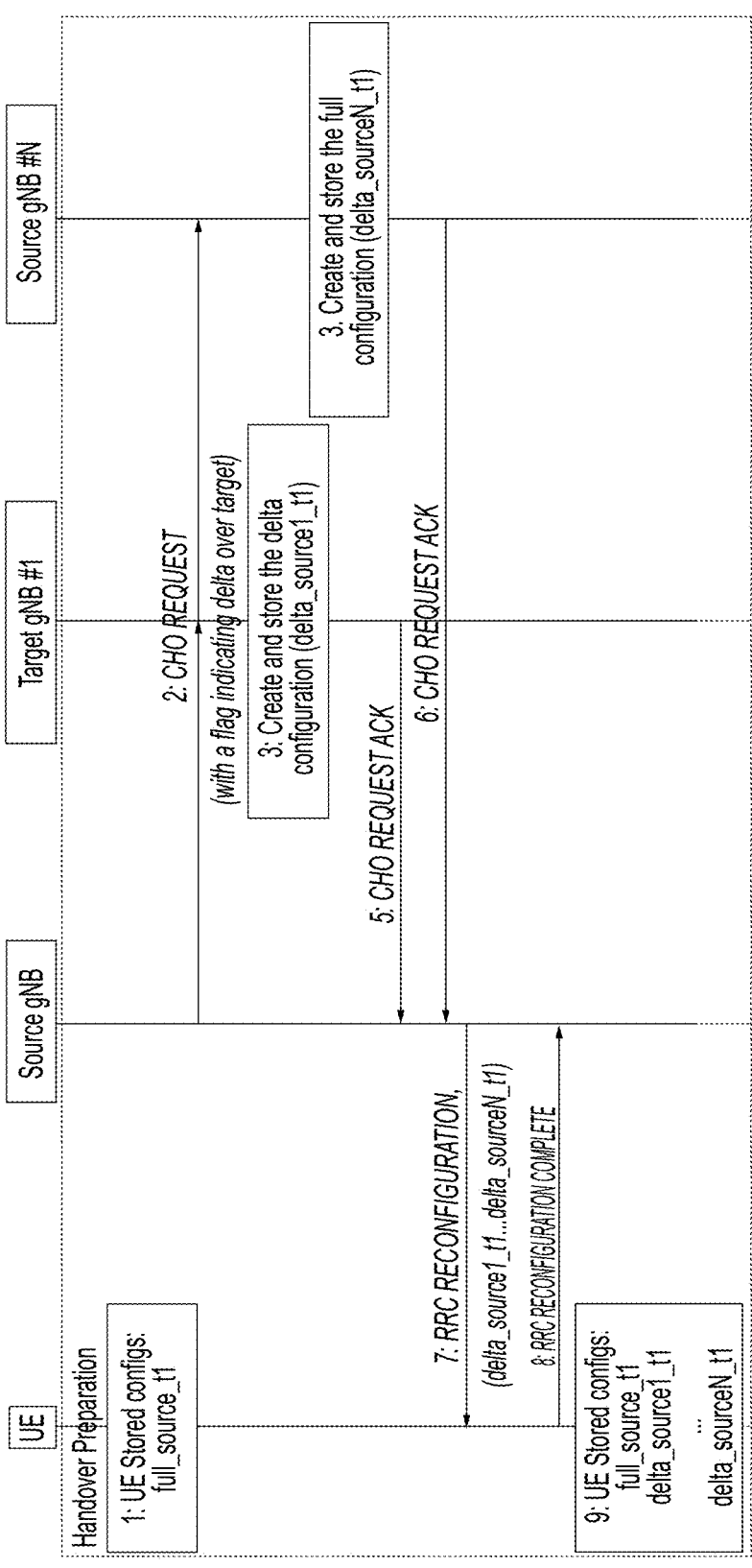
FIGS. 1A-1B illustrate an example implementation procedure to generate delta over target configurations in CHO considering initial delta over source target cell configurations.

Before discussing the example embodiments in any more detail, first an overview will be provided. Some example embodiments relate to cell change in a wireless telecommunications network. A user equipment may connect typically to a first or source cell with a first or reference bearer configuration. One or more target cells are provided to which the user equipment may connect in a cell change from the first cell. The first bearer configuration is provided to the target cells and stored by the network nodes providing those target cells. Those network nodes then provide either a full or a delta-over-reference configuration for the target cells to be provided to the user equipment. Those full configurations can be used or those delta-over-reference configurations can be applied to the first bearer configuration currently being used for the first cell to enable the user equipment to connect to the target cells. Should the first bearer configuration be updated or modified to an updated first bearer configuration, then details of that updated first bearer configuration are provided to the target cells. The network nodes providing those target cells can then provide a delta-over-target configuration which contains those configuration changes that would be required to be made to the previously-provided full or delta-over-reference configurations to enable the user equipment to connect to the target cells following the update to the first bearer configuration. In particular, the delta-over-target configuration identifies differences between the updated target configuration and the target bearer configuration. The delta-over-target configurations can then be provided to the user equipment. This process of providing delta-over-target configurations can be repeated each time the first bearer configuration is updated or modified to an updated first bearer configuration. Previous delta-over-target configurations can be deleted or overwritten within the user equipment. Deriving delta-over-target configurations helps to reduce the amount of information conveyed between the network and the user equipment since redundant information is omitted from the delta-over-target configurations. Once a cell change is to occur, then a most-recent delta-over-target configuration can be applied to either the full configuration of the target cell or to the delta-over-reference configuration and the reference configuration to determine the full configuration of that target cell and allow the user equipment to connect to that target cell. This approach enables to user equipment to rapidly change from cell to cell with reduced quantities of signalling.

Delta Configuration During Cell Change—Overview
Conditional Handover (CHO) (Rel. 16):

A CHO procedure has been introduced in 3GPP Rel. 16 to improve the mobility robustness. In case of CHO, the network may prepare multiple target cells where each conditional handover reconfiguration is associated with a CHO execution condition that is evaluated by the user equipment (UE). The CHO execution condition refers to a measurement identifier (ID) associating a measurement object with a reporting configuration and is configured by source gNodeB (gNB). The reporting configuration defines the measurement event (A3 or A5) which triggers the reporting of the configured measurements. The same measurement events are also configured by the serving UE which will trigger the CHO execution upon the configured measurement configuration is met. Whenever a CHO execution condition is met, the corresponding target configuration is selected, and handover is executed towards the selected target cell. The signaling procedure for conditional handover is provided in in TS 38.300, section 9.2.3.4.2.

Conditional PSCell Addition and Change (CPAC):

In Rel. 16, Conditional PSCell Change (CPC) has been specified for intra-Secondary Node (SN) scenario [TS 37.340]. CPC has been extended in Rel. 17 for inter-SN scenarios where it has two flavors: Master Node (MN)-initiated CPC and SN-initiated CPC [R2-2111640].

The further enhancements for mobility work item (RP-213565) in Rel. 18 has the following objective:

To specify mechanism and procedures of NR-DC with selective activation of the cell groups (at least for SCG) via L3 enhancements:

To allow subsequent cell group change after changing CG without reconfiguration and re-initiation of CPC/CPA [RAN2, RAN3, RAN4]

Note: A harmonized RRC modelling approach for objectives 1 and 2 could be considered to minimize the workload in RAN2

In CHO or CPC, the target node can generate either a full or a delta configuration for the candidate target PCell or PSCell, respectively. In case of a full configuration, the UE shall execute the steps that are defined in TS 38.331, Section 5.3.5.11 including releasing/cleaning some of the current dedicated radio configurations and all current common radio configurations and applying the default Medium Access Control (MAC) cell group configuration and Signaling Radio Bearer (SRB) configuration. In case of delta configuration, the configuration of the candidate target cell contains only the parameters that need to be modified compared to the current source cell (that is subject for the change). As such, the size of the delta configuration can be much smaller than that of full configuration which reduces substantially the overhead over the radio interface.

Low Layer Triggered Mobility

Lower Layer triggered Mobility (LTM), marked also as L1/2 inter-cell mobility, is one of the objectives for mobility enhancement in Rel. 18. According to the paradigm description, the decision about the cell change is based on L1 measurements and is made in the MAC layer in the Distributed Unit (DU). In LTM, the target node can generate either a full or a delta configuration for the candidate target PCell or PSCell, respectively. In case of a full configuration, the UE shall execute the steps that are defined in TS 38.331, Section 5.3.5.11 including releasing/cleaning some of the current dedicated radio configurations and all current common radio configurations and applying the default MAC cell group configuration and SRB configuration. In case of delta configuration, the configuration of the candidate target cell contains only the parameters that need to be modified compared to the current source cell (that is subject for the change). As such, the size of the delta configuration can be much smaller than that of full configuration which reduces substantially the overhead over the radio interface.

During the evaluation phase of the conditional mobility, whenever the user plane configuration is changed, i.e., the PDU sessions are added/removed/modified, QoS flows are setup/terminated or the Data Radio Bearer (DRB) configurations are modified, the UE must be updated with new DRB reconfigurations via a Radio Resource Control (RRC) reconfiguration procedure. The delay for activating the bearer is the time it takes for this signaling procedure in normal scenarios. In case of classic handover, this reconfiguration needs to be triggered after handover execution. Here the delay will include the handover execution time also. In case of conditional reconfiguration scenario, if the DRB configuration is updated towards UE for current cell, the conditional reconfigurations also need to be modified for the target nodes to reflect this DRB change so that after CHO execution the configurations are aligned at UE and target node. This will introduce additional radio signaling as new RRC reconfigurations should be signaled back to the UE. The problem is that for every DRB configuration update, those re-configurations towards the UE should be repeated. This problem is especially exacerbated for the selective activation, where the prepared configurations are maintained at the UE side for as long as network wants (ideally when UE is under the coverage of the same PCell for the selective activation of Serving Cell Group (SCG)), even after the conditional cell change is executed. This implies that the reconfiguration could happen multiple times during the handover evaluation phase. If those reconfigurations are full configurations, the size of the RRC Reconfiguration message would be quite large, as all the parameters are retransmitted and there are many parameters for which the retransmission is redundant as multiple cells use the same parameter. Another possibility is to use delta configuration, i.e., only the differences between the source config and the target config is transmitted to the UE and the UE can generate the full target config with the full source config and the delta, when the condition for the handover towards that target node holds. However, this delta also suffers the redundancy issue, as there are many parameters, which may always be different between the source and the target and their retransmission is not necessary. The reason is that this delta has been mainly devised for the preparation phase of the conditional handover and not the updates that happen during the evaluation phase. The deltas that are used here are intended mainly for the preparation phase and always contain the differences of the source and target. When UE is initially configured with a target cell configuration, the only configuration UE has that can be most similar to the target configuration is the source configuration. For this reason, the target configuration is indicated as a delta on top of the source configuration. However, once UE has the target configuration in case the target configuration is to be provided anew to the user most of the parameters of the target configurations are redundant for the user plane reconfigurations in the evaluation phase. Hence, it can be seen that the RRC Reconfiguration message for the PDU session and/or modification of the DRB contains repetitive and redundant parameters (i.e., the same target cell parameters except the DRB configuration), which increases the radio signaling overhead unnecessarily. Some example embodiments provide an optimization to reduce this overhead.

In some example embodiments, to optimize the size of the RRC Reconfiguration signaling during the evaluation phase, which is caused by the change of the user plane configurations, a new type of delta configuration is used, where reference for this delta configuration is the initial configuration of the target itself that has been provided in the preparation phase. This new delta is referred to as "delta over target" and the legacy delta set out above is referred to as "delta over source".

Embodiment 1 (Delta Over Target, when Delta Over Source is Used in CHO)

For the case of CHO, during the preparation phase, after receiving the CHO REQUEST, the target gNBs generate and store the delta over source configurations. These configs are then sent back to the source gNB via CHO REQUEST ACK messages, which in turn signals them to the UE via the RRC RECONFIGURATION message. During the evaluation phase, whenever a user plane reconfiguration is needed (PDU session addition/modification/removal, QoS flow setup/terminated or DRB modification) the source node updates the DRB configuration of the UE. Then, the source gNB indicates the new configurations to the target gNBs via the CHO REQUEST message and the targets generate new delta over source configurations internally. A new configuration called "delta over target" carrying the parameters that represents the difference between the initial delta over source configurations and the newly-created delta over source configurations are generated and signaled back to the source gNB with an additional flag or other indication indicating the "delta over target" configuration. The source gNB relays them to the UE via RRC RECONFIGURA-TION. Whenever the condition for handover towards a target gNB is fulfilled, the full target configuration is generated at the UE side by applying the two deltas (i.e., the latest delta over target and the initial delta over source) over the current source gNB full configuration.

Figure 1B:
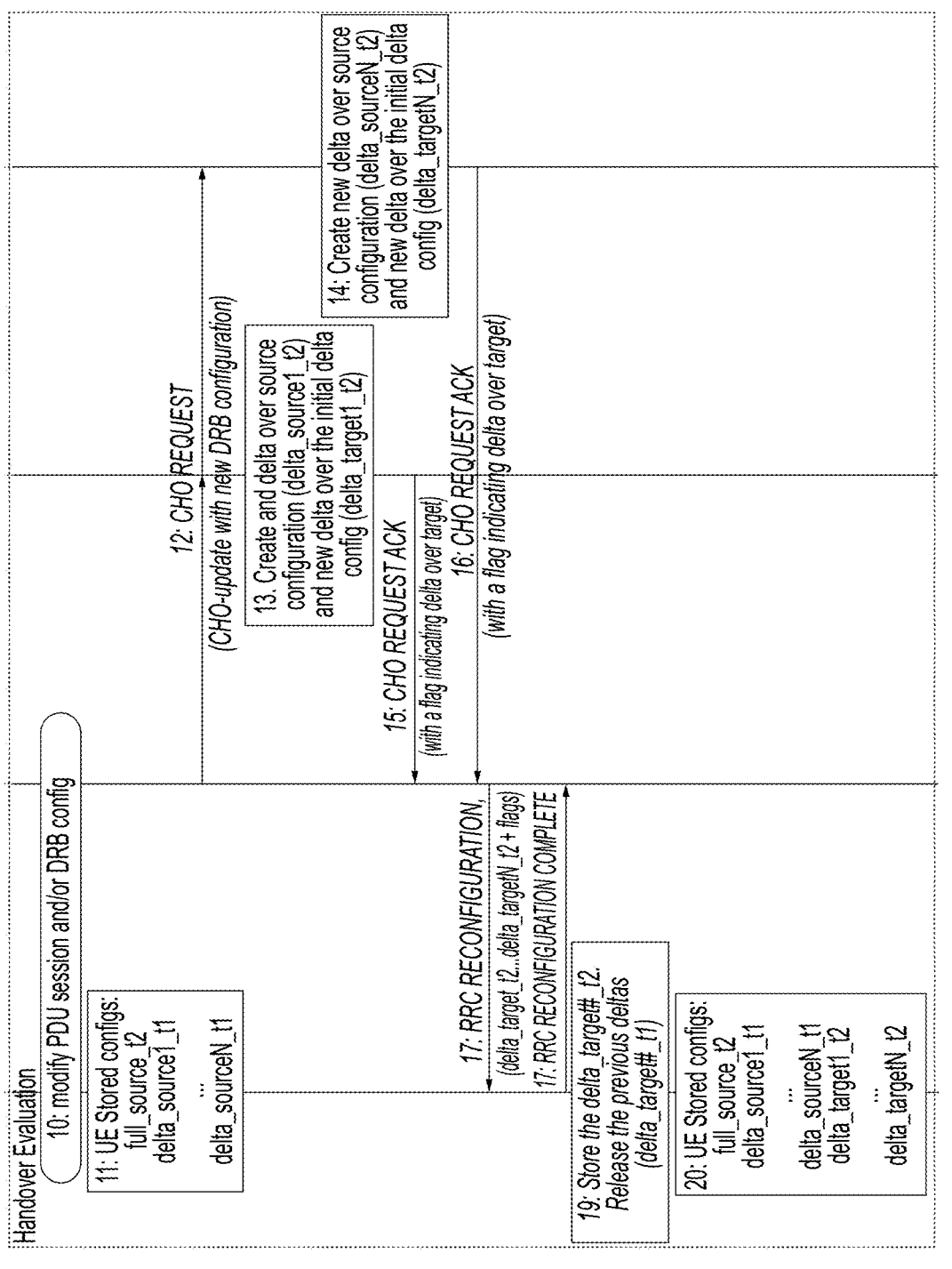

FIGS. 1A-1B illustrate an example implementation procedure to generate delta over target configurations in CHO considering initial delta over source target cell configurations.

Handover Preparation Phase (t=1)

At Step 1, the UE has stored the full configuration of the current source gNB (full_source_t1).

At Step 2, the source gNB sends the CHO REQUEST to the target gNBs (gNBs numbered #1 to #N). Typically, the CHO REQUEST contains an indication to the target gNBs to generate an initial delta over a reference configuration and that the initial delta over a reference configuration it will generate is to be stored by that gNB.

At Steps 3 to 4, the target gNBs generate and store the initial delta over a reference configuration, in this example the reference for these deltas is the source gNB configuration but the reference can equally be a configuration shared between the source and target gNBs.

At Steps 5 to 6, the target gNBs acknowledge the CHO requests with the CHO REQUEST ACK along with the initial delta over source configurations, which is sent back to the source gNB.

At Steps 7 to 8, the RRC reconfigurations with the delta configurations for CHO are sent to the UE and the UE sends the RRC RECONFIGURATION COMPLETE back to the source gNB.

At Step 9, the UE now stores the full source gNB (full_source_t1) and the delta over source configurations (delta_source1_t1, . . . , delta_sourceN_t1).

Handover Evaluation Phase (Here t=2 (which is Later than t=1) but Also Valid for t=3, 4, . . . )

At Step 10, the user plane configuration is updated, e.g., the PDU sessions are added/removed/modified, QoS flows are setup/terminated or the DRB configurations are modified.

At Step 11, because of the update at Step 10, the source gNB configuration for the UE is updated (full_source_t2).

At Step 12, the source gNB sends a new set of CHO REQUEST with updated user plane configurations to the target gNBs.

At Steps 13 to 14, in response to the request in Step 12, the target gNBs create new delta over source configurations internally. Then, the target gNBs create delta over target configurations (delta_target1_12, . . . , delta_targetN_t2), which are configurations with parameters representing the difference of the new "delta over source" to initial delta over source configurations.

At Steps 15 to 16, the target gNBs acknowledge the CHO requests with the CHO REQUEST ACK, along with the new delta over target configurations, which is sent back to the source gNB. A new flag or other indicator is used to indicate that this is delta over target configuration, in contrast with the legacy delta over source.

At Step 17, the source gNB sends the delta over target configurations and the delta over target indication of Steps 15 to 16 via the RRC RECONFIGURATION message.

At Step 18, the UE acknowledges the re-configuration.

At Step 19, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 20, the UE now has the current full source configuration (full_source_t2) along with the initial delta over source configs (delta_source1_t1, . . . , delta_sourceN_t1) and the latest delta over target configs (delta_target1_12, . . . , delta_targetN_t2). When the UE switches to the target cell, it applies the "delta over target" on top of "delta over source" configuration and applies the resulting configuration as a delta over the source configuration.

Table 1 below illustrates the stored source and target configs and what the UE should do at the time of execution to determine the target configurations.

TABLE 1

| UE Stored Source Config | UE Stored Target (candidate) Configs | At the time of execution |
|---|---|---|
| t1 {full_source_t1} | {delta_source1_t1} . . . {delta_sourceN_t1} | full_target1_t1 = full_source_t1 + delta_source1_t1 . . . full_targetN_t1 = full_source_t1 + delta_sourceN_t1 |
| t2 {full_source_t2} | {delta_source1_t1, delta_target1_t2} . . . {delta_sourceN_t1, delta_targetN_t2} | full_target1_t2 = full_source_t2 + delta_source1_t1 + delta_target1_t2 . . . full_targetN_t2 = full_source_t2 + delta_sourceN_t1 + delta_targetN_t2 |

TABLE 1-continued

| UE Stored Source Config | UE Stored Target (candidate) Configs | At the time of execution |
|---|---|---|
| t3 {full_source_t3} | {delta_source1_t1, delta_target1_t3} . . . {delta_sourceN_t1, delta_targetN_t3} | full_target1_t3 = full_source_t3 + delta_source1_t1 + delta_target1_t3 . . . full_targetN_t3 = full_source_t3 + delta_sourceN_t1 + delta_targetN_t3 |

Embodiment 2 (Delta Over Target, when Delta Over Source is Used in CPC)

For the case of CPC, during the preparation phase, after receiving the SN ADDITION REQUEST, the target SNs generate and store the delta over source SN configurations. These configurations are then sent back to the source MN via SN ADDITION REQUEST ACK messages, which in turn signals them to the UE via the RRC RECONFIGURATION message. During the evaluation phase, whenever a user plane reconfiguration is needed (PDU session addition/modification/removal, QoS flow setup/terminated or DRB modification) the source node updates the DRB configuration of the UE. Then, the source MN indicates the new configurations to the target SNs via the SN ADDITION REQUEST message and the targets generate new delta over source configurations internally. A new configuration called "delta over target" carrying the parameters that represents the difference between the initial delta over source configurations and the newly generated delta over source configurations are generated and signaled back to the source MN with an additional flag indicating the "delta over target" configuration. The source MN relays them to the UE via RRC RECONFIGURATION. Whenever the condition for handover towards a target SN is fulfilled, the full target configuration is generated at the UE side by applying the two deltas (i.e., the latest delta over target and the initial delta over source) over the current source SN full configuration.

Figure 2A:
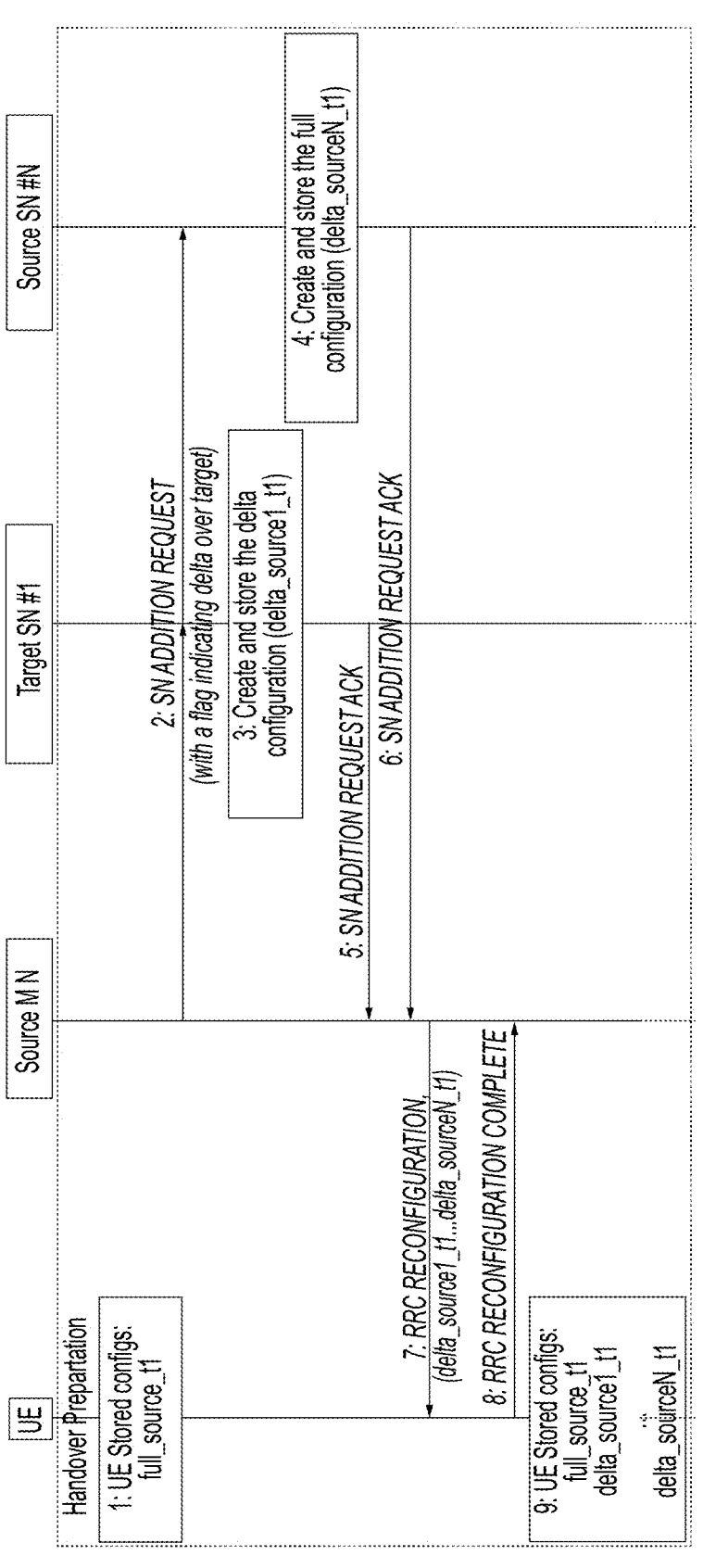
FIGS. 2A-2B illustrate an example implementation procedure to generate delta over target configurations in CPC considering initial delta over source target cell configurations.
Figure 2B:
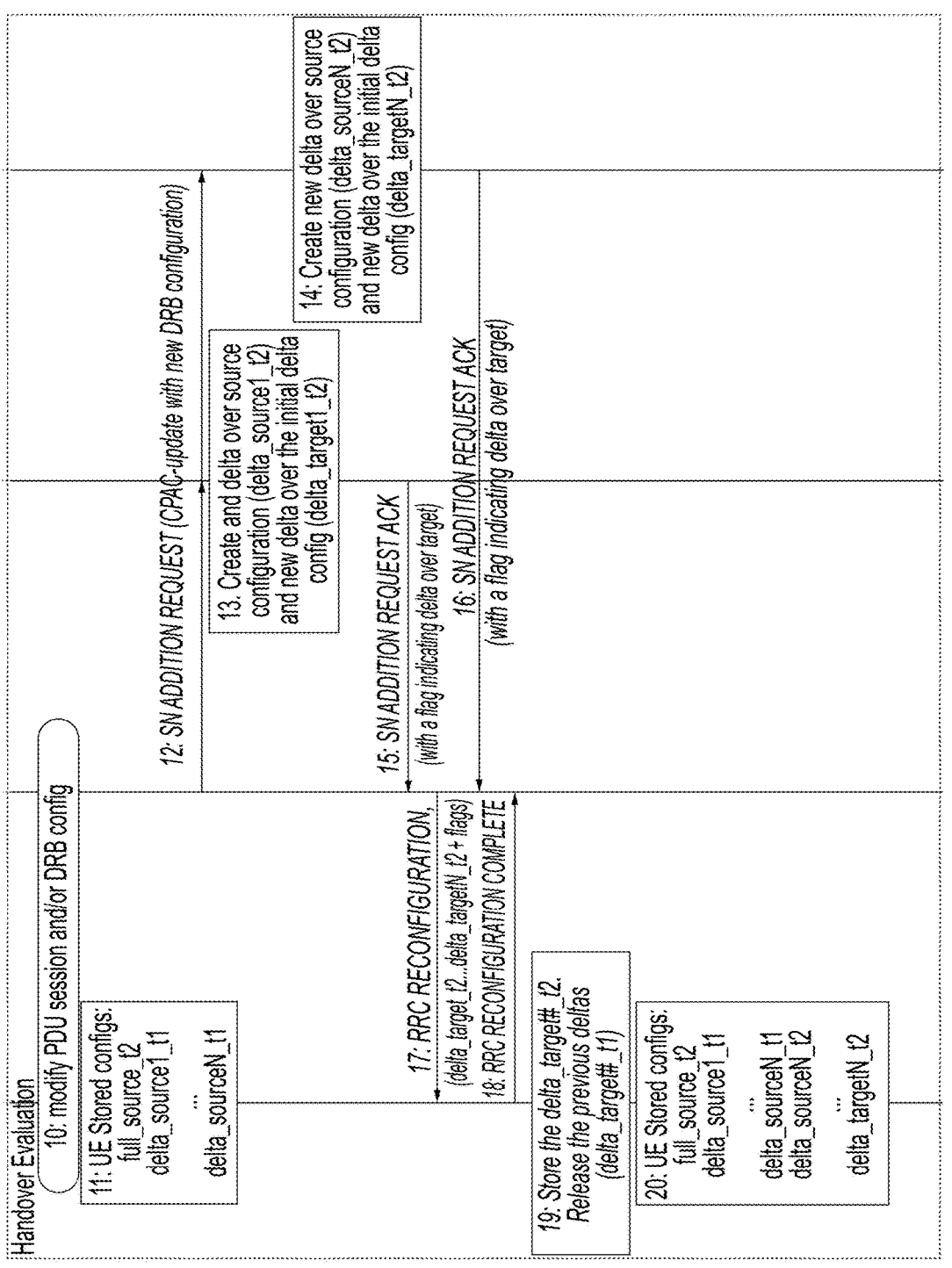

FIGS. 2A-2B illustrate an example implementation procedure to generate delta over target configurations in CPC considering initial delta over source target cell configurations.

Handover Preparation Phase (t=1)

At Step 1, the UE has stored the full configuration of the current source SN (full_source_t1).

At Step 2, the source MN sends the SN ADDITION REQUEST to the target SNs (SNs numbered #1 to #N). Typically, the SN ADDITION REQUEST contains an indication to the target SNs to generate an initial delta over a reference configuration and that the initial delta over a reference configuration it will generate is to be stored by that SN.

At Steps 3 to 4, the target SNs generate and store the initial delta over delta over a reference configuration, in this example the reference for these deltas is the source SN configuration.

At Steps 5 to 6, the target SNs acknowledge the SN addition requests with the SN ADDITION REQUEST ACK along with the initial delta over source configurations, which is sent back to the source MN.

At Steps 7 to 8, the RRC reconfigurations with the delta configurations for SN addition are sent to the UE and the UE sends the RRC RECONFIGURATION COMPLETE back to the source MN.

At Step 9, the UE now stores the full source SN (full_source_t1) and the delta over source configurations (delta_source1_t1, . . . , delta_sourceN_t1).

Handover Evaluation Phase (Here t=2 (which is Later than t=1) but Also Valid for t=3, 4, . . . )

At Step 10, the user plane configuration is updated, e.g., the PDU sessions are added/removed/modified, QoS flows are setup/terminated or the DRB configurations are modified.

At Step 11, because of the update at Step 10, the source SN configuration for the UE is updated (full_source_t2).

At Step 12, the source MN sends a new set of SN ADDITION REQUEST with updated user plane configurations to the target SNs.

At Steps 13 to 14, in response to the request in Step 12, the target SNs create new delta over source configurations internally. Then, the target SNs create delta over target configurations (delta_target1_t2, . . . , delta_targetN_t2), which are configurations with parameters representing the difference of the new "delta over source" to initial delta over source configurations.

At Steps 15 to 16, the target SNs acknowledge the SN addition requests with the SN ADDITION REQUEST ACK, along with the new delta over target configurations, which is sent back to the source MN. A new flag (or other indicator) is used to indicate that this is delta over target configuration, in contrast with the legacy delta over source.

At Step 17, the source MN sends the delta over target configurations and the delta over target indication of step 15-16 via the RRC RECONFIGURATION message.

At Step 18, the UE acknowledges the re-configuration.

At Step 19, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 20, the UE now has the current full source configuration (full_source_t2) along with the initial delta over source configs (delta_source1_t1, . . . , delta_sourceN_t1) and the latest delta over target configs (delta_target1_12, . . . , delta_targetN_t2). When the UE switches to the target cell, it applies the "delta over target" on top of "delta over source" configuration and applies the resulting configuration as a delta over the source configuration.

Table 2 below illustrates the stored source and target configs and what the UE should do at the time of execution to get the target configurations.

TABLE 2

| UE Stored Source Config | UE Stored Target (candidate) Configs | At the time of execution |
|---|---|---|
| t1 {full_source_t1} | {delta_source1_t1} . . . {delta_sourceN_t1} | full_target1_t1 = full_source_t1 + delta_source1_t1 . . . full_targetN_t1 = full_source_t1 + delta_sourceN_t1 |

TABLE 2-continued

| UE Stored Source Config | UE Stored Target (candidate) Configs | At the time of execution |
|---|---|---|
| t2 {full_source_t2} | {delta_source1_t1, delta_target1_t2} . . . {delta_sourceN_t1, delta_targetN_t2} | full_target1_t2 = full_source_t2 + delta_source1_t1 + delta_target1_t2 . . . full_targetN_t2 = full_source_t2 + delta_sourceN_t1 + delta_targetN_t2 |
| t3 {full_source_t3} | {delta_source1_t1, delta_target1_t3} . . . {delta_sourceN_t1, delta_targetN_t3} | full_target1_t3 = full_source_t3 + delta_source1_t1 + delta_target1_t3 . . . full_targetN_t3 = full_source_t3 + delta_sourceN_t1 + delta_targetN_t3 |

Some example embodiments provide general enhancement when making use of delta configurations, which is a well-known concept in wireless telecommunications networks Embodiment 3 (Delta Over Target, when Full Configuration is Used in CHO)

For the case of CHO, during the preparation phase, after receiving the CHO REQUEST, the target gNBs generate and store the full target configurations. These configurations are then sent back to the source gNB via CHO REQUEST ACK messages, which in turn signals them to the UE via the RRC RECONFIGURATION message. During the evaluation phase, whenever a user plane reconfiguration is needed (PDU session addition/modification/removal, QoS flow setup/terminated or DRB modification) the source node updates the DRB configuration of the UE. Then, the source gNB indicates the new configurations to the target gNBs via the CHO REQUEST message and the targets generate new full target configurations internally. A new configuration called "delta over target" carrying the parameters that represents the difference between the initial full configurations and the newly generated full configurations are generated and signaled back to the source gNB with an additional flag (or other indicator) indicating the "delta over target" configuration. The source gNB relays them to the UE via RRC RECONFIGURATION. Whenever the condition for handover towards a target gNB is fulfilled, the full target configuration is generated at the UE side by applying the latest delta over target over the initial full target configuration.

Figure 3A:
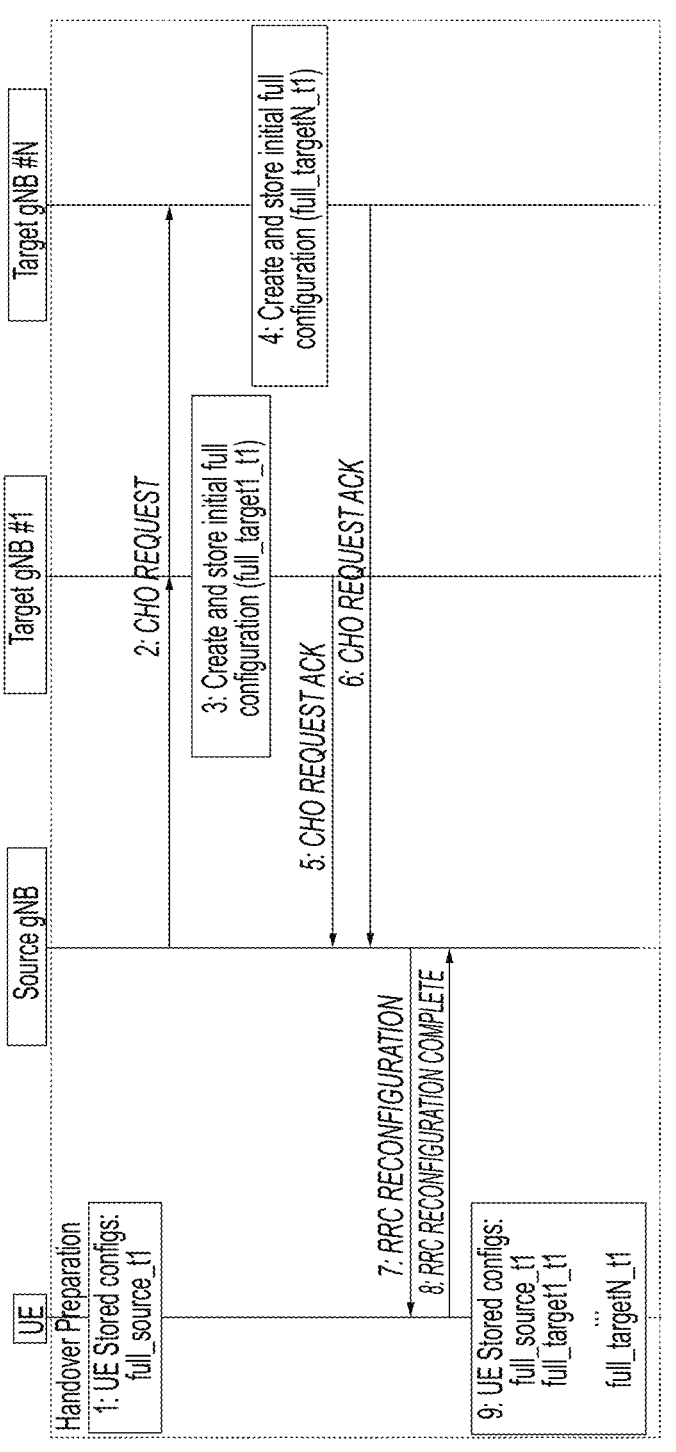
FIGS. 3A-3B illustrate an example implementation procedure to generate delta over target configurations in CHO considering initial full target cell configurations.
Figure 3B:
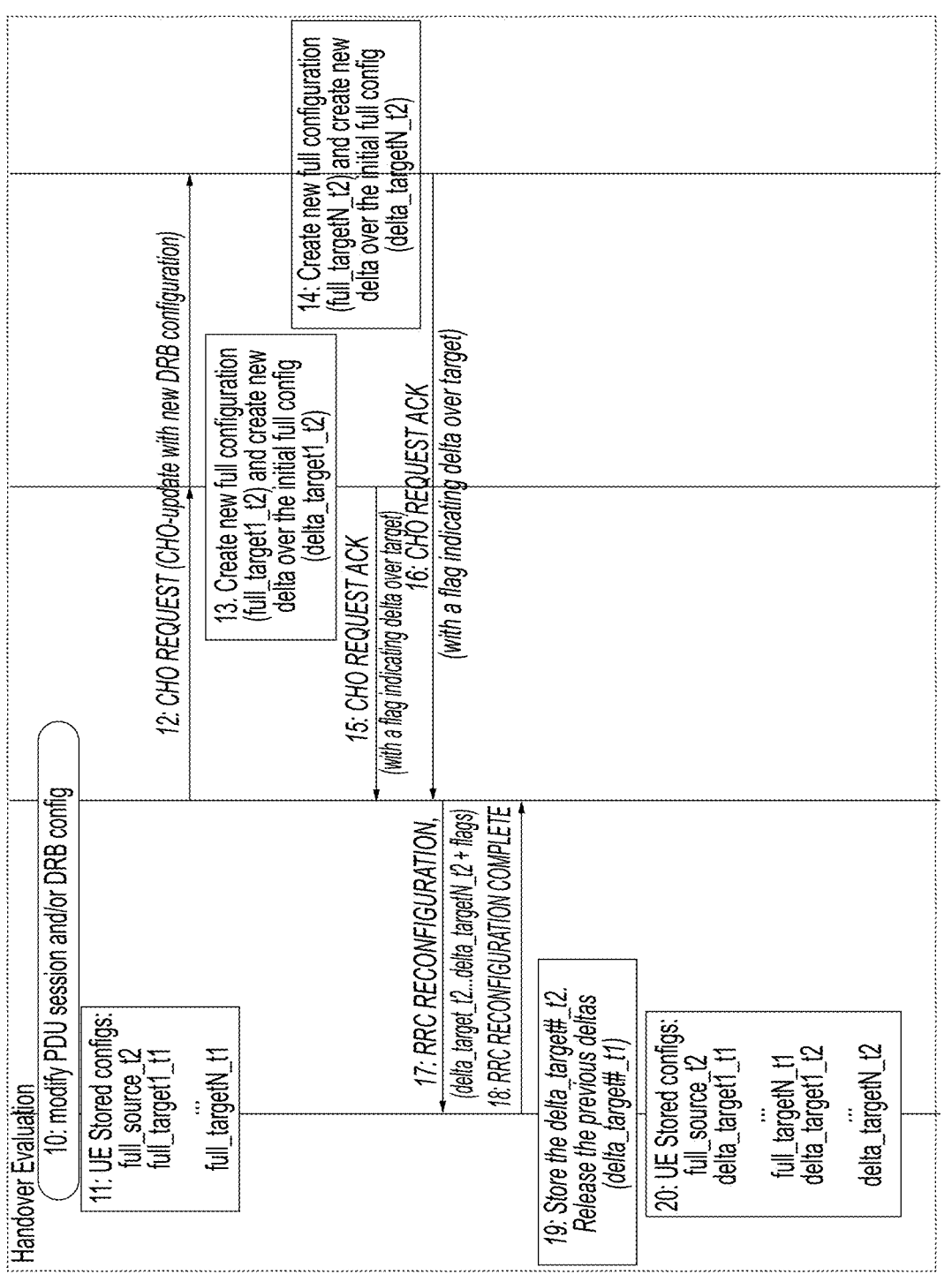

FIGS. 3A-3B illustrate an example implementation procedure to generate delta over target configurations in CHO considering initial full target cell configurations.

Handover Preparation Phase (t=1)

At Step 1, the UE has stored the full configuration of the current source gNB (full_source_t1).

At Step 2, the source gNB sends the CHO REQUEST to the target gNBs (gNBs numbered #1 to #N). Typically, the CHO REQUEST contains an indication to the target gNBs that an initial full target configuration that it will generate is to be stored by that gNB.

At Steps 3 to 4, the target gNBs generate and store the initial full target configurations.

At Steps 5 to 6, the target gNBs acknowledge the CHO requests with the CHO REQUEST ACK along with the initial full target configurations, which is sent back to the source gNB.

At Steps 7 to 8, the RRC reconfigurations with the full target configurations for CHO are sent to the UE and the UE sends the RRC RECONFIGURATION COMPLETE back to the source gNB.

At Step 9, the UE now stores the full source gNB (full_source_t1) and full target configurations (full_target1_t1, . . . , full_targetN_t1).

Handover Evaluation Phase (Here t=2 (which is Later than t=1) but Also Valid for t=3, 4, . . . )

At Step 10, the user plane configuration is updated, e.g., the PDU sessions are added/removed/modified, QoS flows are setup/terminated or the DRB configurations are modified.

At Step 11, because of the update at Step 10, the source gNB configuration for the UE is updated (full_source_t2).

At Step 12, the source gNB sends a new set of CHO REQUEST with updated user plane configurations to the target gNBs.

At Steps 13 to 14, in response to the request in Step 12, the target gNBs create new full configurations internally. Then, the target gNBs create delta over target configurations (delta_target1_12, . . . , delta_targetN_t2), which are configurations with parameters representing the difference of the new full configurations with the initial full configurations.

At Steps 15 to 16, the target gNBs acknowledge the CHO requests with the CHO REQUEST ACK, along with the new delta over target configurations, which is sent back to the source gNB. A new flag (or other indicator) is used to indicate that this is delta over target configuration, in contrast with the legacy delta over source.

At Step 17, the source gNB sends the delta over target configurations and the delta over target indication of step 15-16 via the RRC RECONFIGURATION message.

At Step 18, the UE acknowledges the re-configuration.

At Step 19, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 20, the UE now has the current full source configuration (full_source_t2) along with the initial full target configs (full_target1_t1, . . . , full_targetN_t1) and the latest delta over target configs (delta_target1_12, . . . , delta_targetN_t2). When the UE switches to the target cell, it applies the "delta over target" on top of full target configurations.

Table 3 below illustrates the stored source and target configs and what the UE should do at the time of execution to get the target configs.

TABLE 3

| UE Stored Source Config | UE Stored Target (candidate) Configs | At the time of execution |
| --- | --- | --- |
| t1 {full_source_t1} | {full_target1_t1} ... {full_targetN_t1} | full_target1_t1 = full_target1_t1 ... full_targetN_t1 = full_targetN_t1 |

TABLE 3-continued

| UE Stored Source Config | UE Stored Target (candidate) Configs | At the time of execution |
| --- | --- | --- |
| t2 {full_source_t2} | {full_target1_t1, delta_target1_t2} ... {full_targetN_t1, delta_targetN_t2} | full_target1_t2 = full_target1_t1 + delta_target1_t2 ... full_targetN_t2 = full_targetN_t1 + delta_targetN_t2 |
| t3 {full_source_t3} | {full_target1_t1, delta_target1_t3} ... {full_targetN_t1, delta_targetN_t3} | full_target1_t3 = full_target1_t1 + delta_target1_t3 ... full_targetN_t3 = full_targetN_t1 + delta_targetN_t3 |

Embodiment 4 (Delta Over Target, when Full Configuration is Used in CPC)

For the case of CPC, during the preparation phase, after receiving the SN ADDITION REQUEST, the target SNs generate and store the full target SN configurations. These configurations are then sent back to the source MN via SN ADDITION REQUEST ACK messages, which in turn signals them to the UE via the RRC RECONFIGURATION message. During the evaluation phase, whenever a user plane reconfiguration is needed (PDU session addition/modification/removal, QoS flow setup/terminated or DRB modification) the source node updates the DRB configuration of the UE. Then, the source MN indicates the new configurations to the target SNs via the SN ADDITION REQUEST message and the targets generate full target SN configurations internally. A new configuration called "delta over target" carrying the parameters that represents the difference between the initial full target SN configurations and the newly generated full target SN configurations are generated and signaled back to the source MN with an additional flag (or other indication) indicating the "delta over target" configuration. The source MN relays them to the UE via RRC RECONFIGURATION. Whenever the condition for handover towards a target SN is fulfilled, the full target configuration is calculated at the UE side by applying the latest delta over target over the initial full target SN configuration.

Figure 4A:
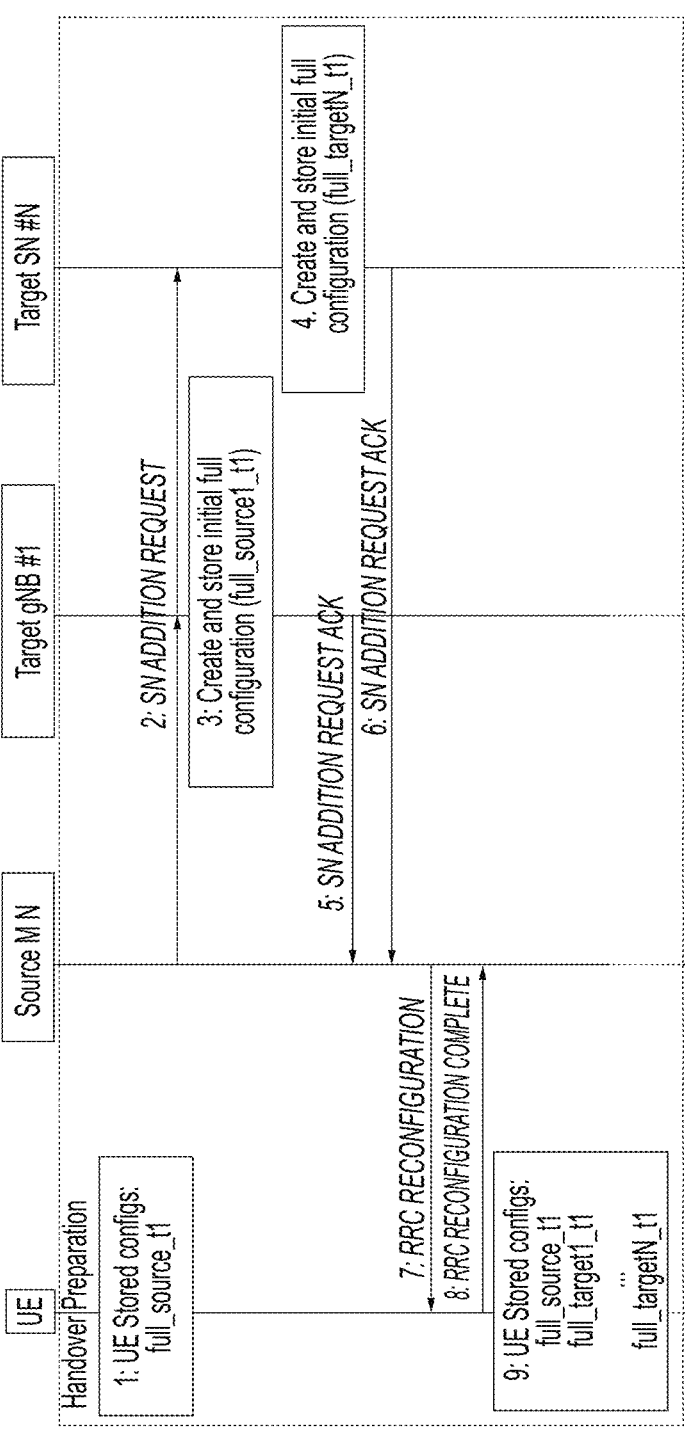
FIGS. 4A-4B illustrate an example implementation procedure to generate delta over target configurations in CPC considering initial full target cell configurations.
Figure 4B:
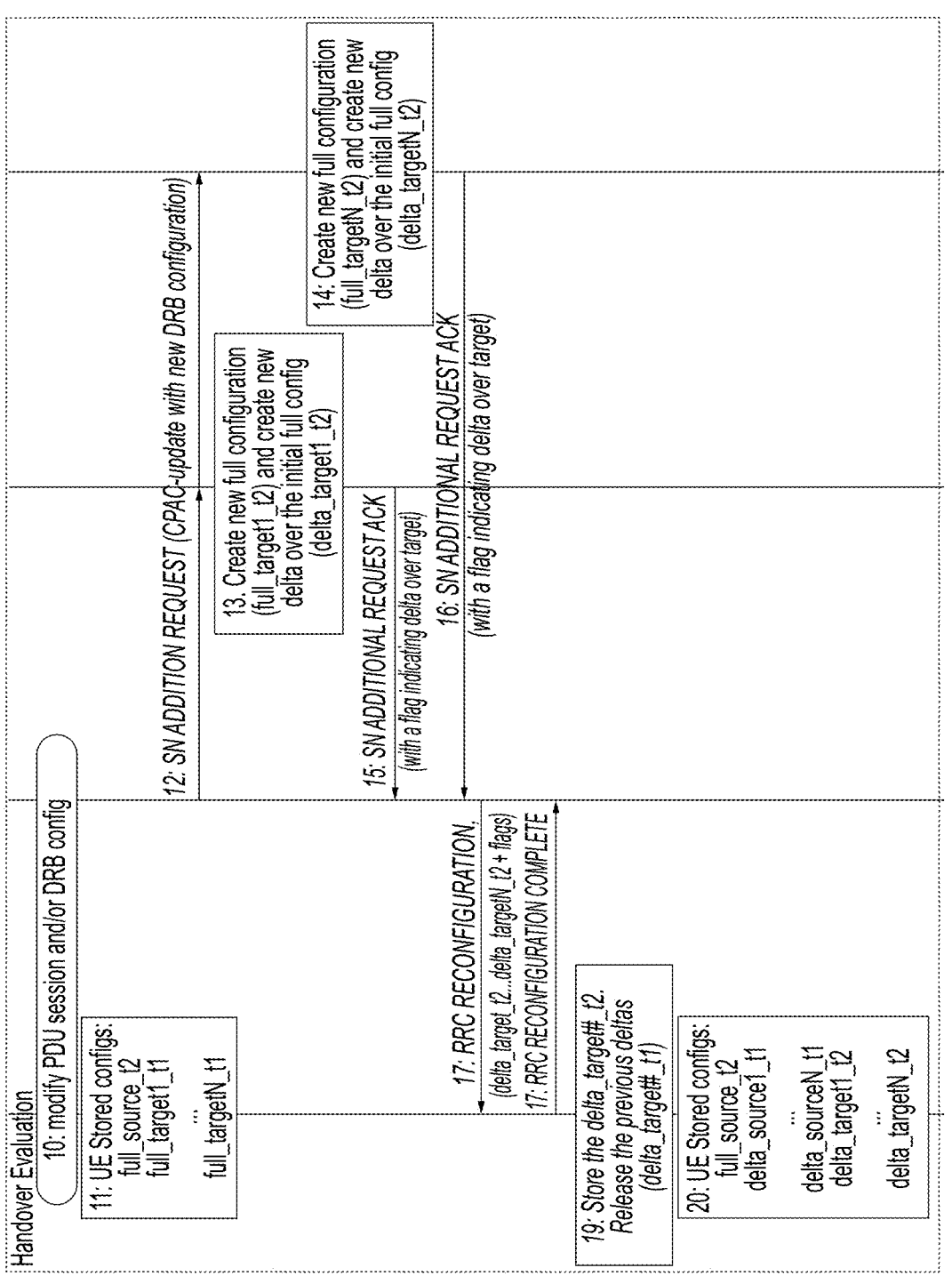

FIGS. 4A-4B illustrate an example implementation procedure to generate delta over target configurations in CPC considering initial full target cell configurations.

Handover Preparation Phase (t=1)

At Step 1, the UE has stored the full configuration of the current source SN (full_source_t1).

At Step 2, the source MN sends the SN ADDITION REQUEST to the target SNs (SNs numbered #1 to #N). Typically, the SN ADDITION REQUEST contains an indication to the target SNs that an full target configuration that it will generate is to be stored by that SN.

At Steps 3 to 4, the target SNs generate and store the initial full target configurations.

At Steps 5 to 6, the target SNs acknowledge the SN Addition requests with the SN ADDITION REQUEST ACK along with the initial full target configurations, which is sent back to the source MN.

At Steps 7 to 8, the RRC reconfigurations with the full target configurations for SN Addition are sent to the UE and the UE sends the RRC RECONFIGURATION COMPLETE back to the source MN.

At Step 9, the UE now stores the full source gNB (full_source_t1) and full target configurations (full_target1_t1, . . . , full_targetN_t1).

Handover Evaluation Phase (Here t=2 (which is Later than t=1) but Also Valid for t=3, 4, . . . )

At Step 10, the user plane configuration is updated, e.g., the PDU sessions are added/removed/modified, QoS flows are setup/terminated or the DRB configurations are modified.

At Step 11, because of the update at Step 10, the source SN configuration for the UE is updated (full_source_t2).

At Step 12, the source MN sends a new set of SN ADDITION REQUEST with updated user plane configurations to the target SNs.

At Steps 13 to 14, in response to the request in Step 12, target SNs create new full configurations internally. Then, the target SNs create delta over target configurations (delta_target1_t2, . . . , delta_targetN_t2), which are the configurations with parameters representing the difference of the new full configurations to initial full configurations.

At Steps 15 to 16, the target SNs acknowledge the SN Addition requests with the SN ADDITION REQUEST ACK, along with the new delta over target configurations, which is sent back to the source MN. A new flag is used to indicate that this is delta over target configuration, in contrast with the legacy delta over source.

At Step 17, the source MN sends the delta over target configurations and the delta over target indication of Step 15-16 via the RRC RECONFIGURATION message.

At Step 18, the UE acknowledges the re-configuration.

At Step 19, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 20, the UE now has the current full source configuration (full_source_t2) along with the initial full target configs (full_target1_t1, . . . , full_targetN_t1) and the latest delta over target configs (delta_target1_12, . . . , delta_targetN_t2). When the UE switches to the target cell, it applies the "delta over target" on top of full target configurations.

Table 4 below illustrates the stored source and target configs and what the UE should do at the time of execution to get the target configurations.

TABLE 4

| UE Stored Source Config | UE Stored Target (candidate) Configs | At the time of execution |
|---|---|---|
| t1 {full_source_t1} | {full_target1_t1} . . . {full_targetN_t1} | full_target1_t1 = full_target1_t1 . . . full_targetN_t1 = full_targetN_t1 |
| t2 {full_source_t2} | {full_target1_t1, delta_target1_t2} . . . {full_targetN_t1, delta_targetN_t2} | full_target1_t2 = full_target1_t1 + delta_target1_t2 . . . full_targetN_t2 = full_targetN_t1 + delta_targetN_t2 |

TABLE 4-continued

| UE Stored Source Config | UE Stored Target (candidate) Configs | At the time of execution |
|---|---|---|
| t3 {full_source_t3} | {full_target1_t1, delta_target1_t3} . . . {full_targetN_t1, delta_targetN_t3} | full_target1_t3 = full_target1_t1 + delta_target1_t3 . . . full_targetN_t3 = full_targetN_t1 + delta_targetN_t3 |

Embodiment 5 (Delta Over Target, when Delta Over Source is Used in LTM)

Like the CHO and CPC cases, in LTM, during the preparation phase, the CU generates and stores the delta over source configurations. These configurations are then sent back to the source gNB, which in turn signals them to the UE via the RRC RECONFIGURATION message. During the LTM evaluation phase, whenever a user plane reconfiguration is needed (PDU session addition/modification/removal, QoS flow setup/terminated or DRB modification) the source node updates the DRB configuration of the UE. Then, the CU generates new "delta over target" configurations, carrying the parameters that represents the difference between the initial delta target DU configurations and the newly generated delta target DU configurations, with an additional flag (or other indication) indicating the "delta over target" configuration, which are sent to the UE. Whenever the LTM handover takes place, the full target configuration is calculated at the UE side by applying the two deltas (i.e., the latest delta over target and the initial delta over source) over source full configuration.

Figure 5A:
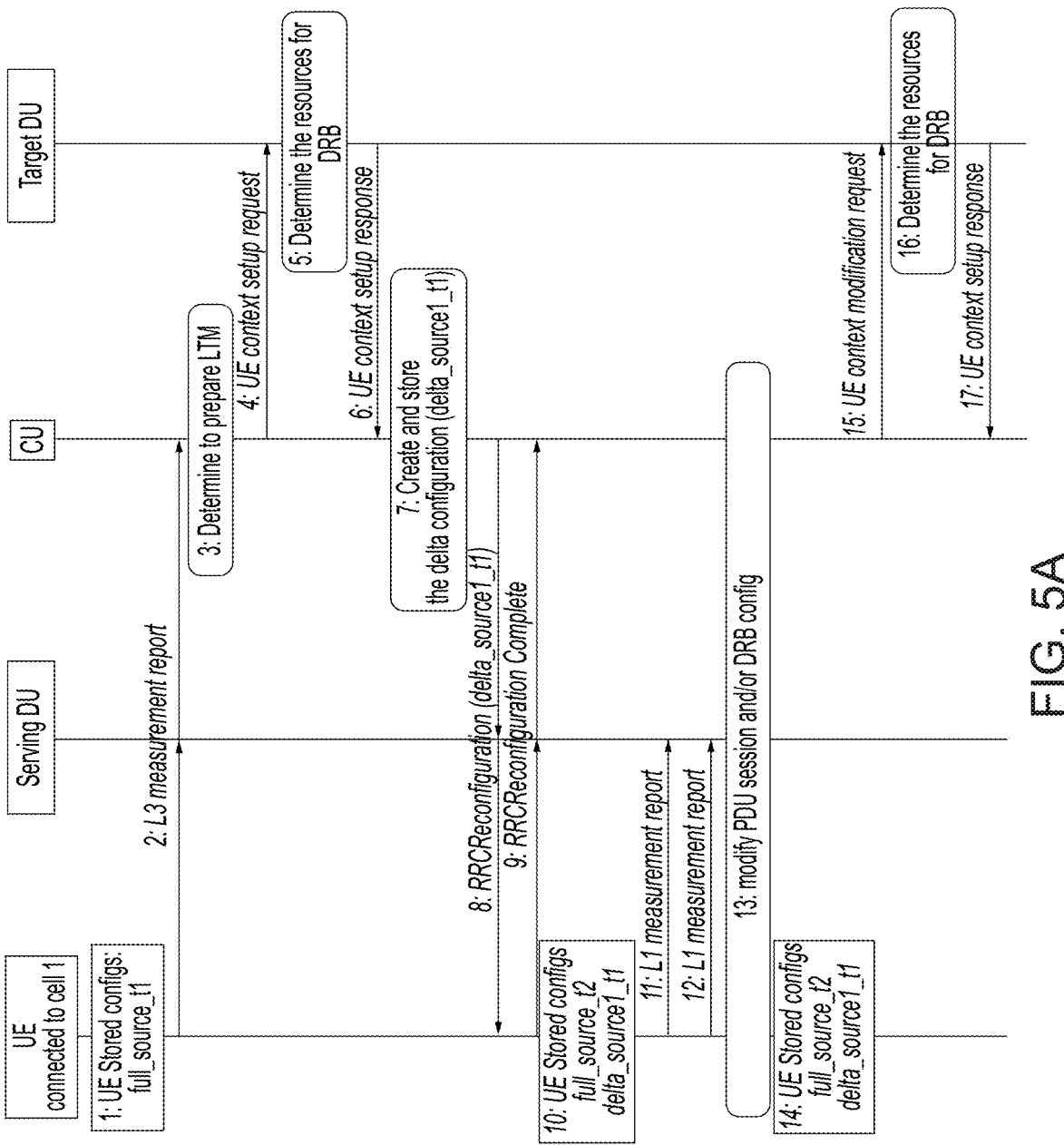
FIGS. 5A-5B illustrate an example implementation procedure to generate delta over target configurations in LTM considering initial delta over source target cell configurations.
Figure 5B:
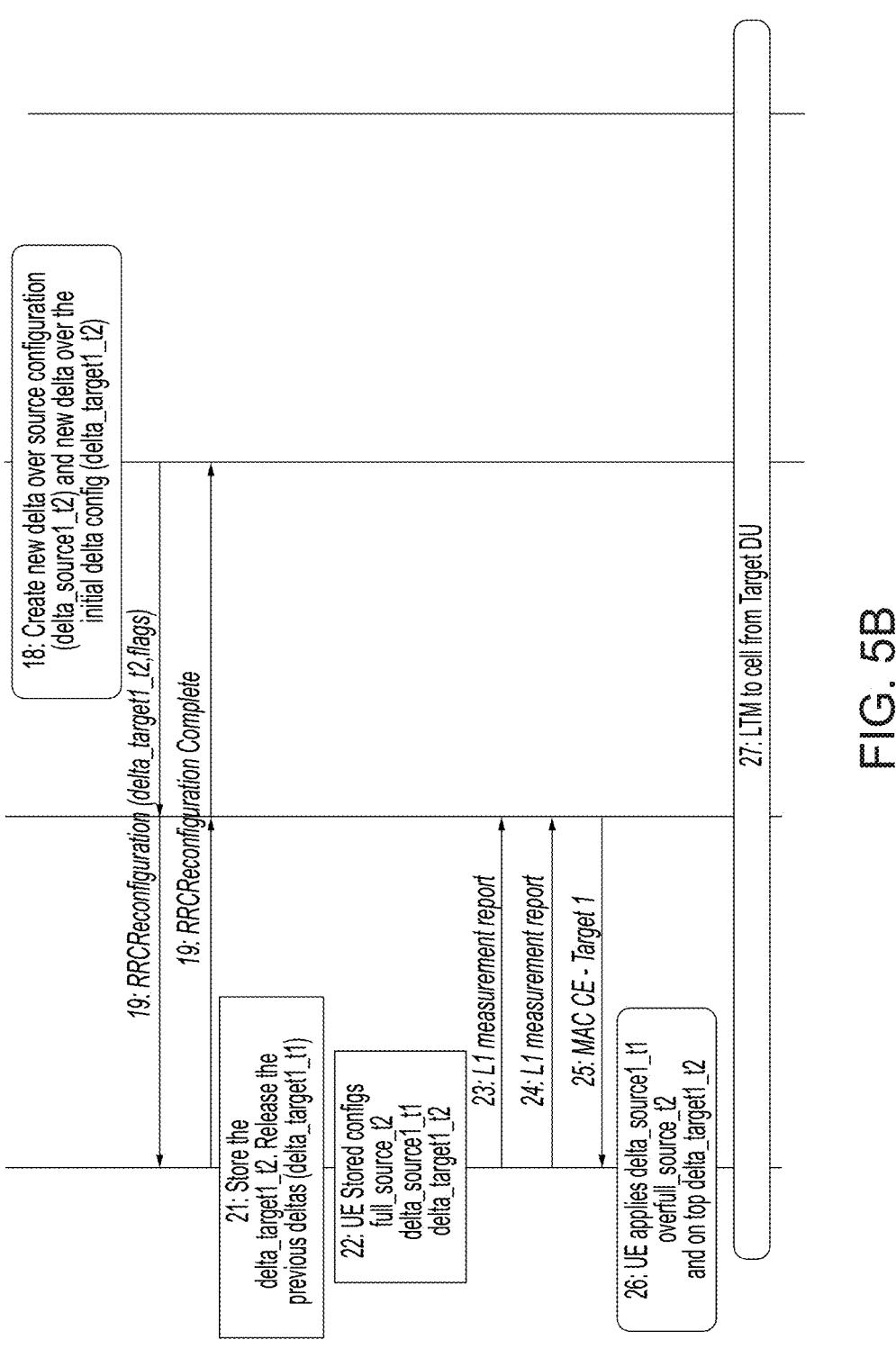

FIGS. 5A-5B illustrate an example implementation procedure to generate delta over target configurations in LTM considering initial delta over source target cell configurations.

Handover Preparation Phase (t=1)

At Step 1, the UE has stored the full configuration of the current serving cell (full_source_t1).

At Steps 2 to 3, the UE, using the current RRC configuration provides L3 measurement reports to the serving CU, via the serving DU.

At Steps 4 to 6, the CU decides that it should prepare LTM and sends a UE context setup request to the target DUs. In these steps, the CU may coordinate with the serving DU as well using a UE context modification procedure to share the target cell configuration—this is however omitted from FIGS. 5A-5B.

At Step 7, the CU generates and stores the initial delta over source configurations. The reference for these deltas is the source configuration.

At Steps 8 to 9, the RRC reconfigurations with the delta configurations for LTM are sent to the UE and the UE sends the RRC configuration complete to the source CU (via the source DU).

At Step 10, the UE now stores the full source cell (full_source_t1) and the delta over source configurations (delta_source1_t1, . . . , delta_sourceN_t1).

Handover Evaluation Phase (Here t=2 (which is Later than t=1) but Also Valid for t=3, 4 . . . )

At Steps 11 to 12, the UE provides the L1 measurements to the source DU, which evaluates them.

At Step 13, the user plane configuration is updated, e.g., the PDU sessions are added/removed/modified, QoS flows are setup/terminated or the DRB configurations are modified.

At Step 14, because of the update at Step 13, the source cell configuration for the UE is updated (full_source_t2).

At Steps 15 to 17, the CU sends a UE modification request to the target DUs with updated user plane configurations and receives a confirmation about the resources.

At Step 18, the CU creates a new delta over source configurations internally. Then, the target CU create delta over target configurations (delta_target1_t2), which is the configuration with parameters representing the difference of the delta over source configurations with the initial delta over source configurations.

At Steps 19 to 20, the CU sends the delta over target configurations and the indication flags via the RRC reconfigurations and gets the respective response.

At Step 21, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 22, the UE now has the current full source configuration (full_source_t2) along with the initial delta over source configs (delta_source1_t1, . . . , delta_sourceN_t1) and the latest delta over target configs (delta_target1_12, . . . , delta_targetN_t2).

At Steps 23 to 27, the UE provides (as during the whole process) the L1 measurement reports. Once the serving DU decides to trigger the cell change it sends a MAC CE. The UE applies delta_source1_t1, over full_source_t2 and on top delta_target1_t2. Then it performs cell change; note that this process may happen before the cell change triggering.

Table 5 below illustrates the stored source and target configurations and what the UE should do at the time of execution to get the target configurations.

TABLE 5

| | UE Stored Source Config | UE Stored Target (candidate) Configs | At the time of execution |
|---|---|---|---|
| t1 | {full_source_t1} | {delta_source1_t1} | full_target1_t1 = full_source_t1 + delta_source1_t1 |
| t2 | {full_source_t2} | {delta_source1_t1, delta_target1_t2} | full_target1_t2 = full_source_t2 + delta_source1_t1 + delta_target1_t2 |
| t3 | {full_source_t3} | {delta_source1_t1, delta_target1_t3} | full_target1_t3 = full_source_t3 + delta_source1_t1 + delta_target1_t3 |

Embodiment 6 (Delta Over Target, when Full Configuration is Used in LTM)

Like the CHO and CPC cases, in LTM, during the preparation phase, the CU generates and stores the full target configurations. These configs are then sent back to the source gNB, which in turn signals them to the UE via the RRC RECONFIGURATION message. During the LTM evaluation phase, whenever a user plane reconfiguration is needed (PDU session addition/modification/removal, QoS flow setup/terminated or DRB modification) the source node updates the DRB configuration of the UE. Then, the CU generates "delta over target" configurations, carrying the parameters that represents the difference between the initial full target DU configurations and the newly generated full target DU configurations, with an additional flag indicating the "delta over target" configuration, which are sent to the UE. Whenever the LTM handover takes place, the full target configuration is calculated at the UE side by applying the target delta over the initial full target config.

Figure 6A:
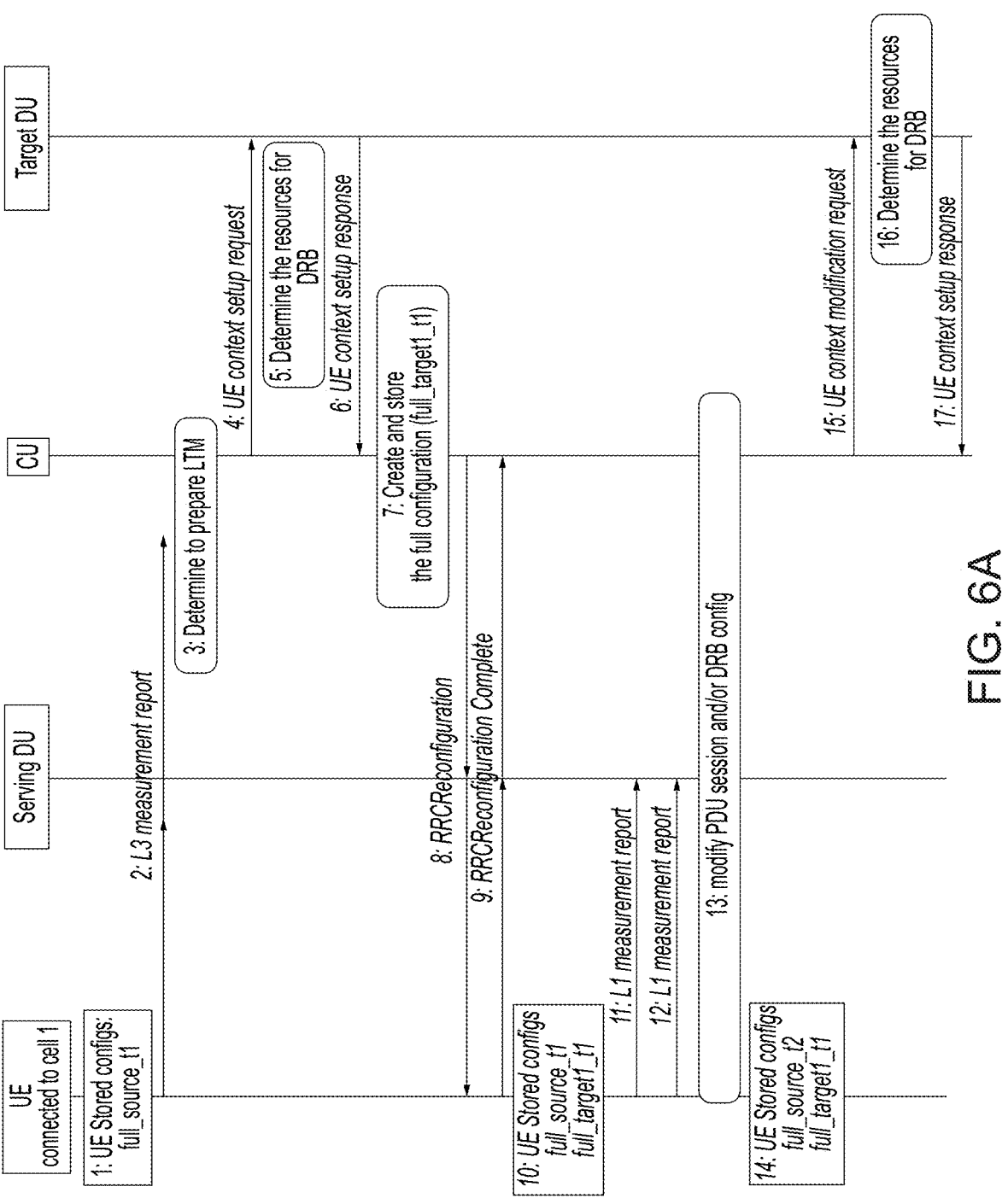
FIGS. 6A-6B illustrate an example implementation procedure to generate delta over target configurations in LTM considering initial full target cell configurations.
Figure 6B:
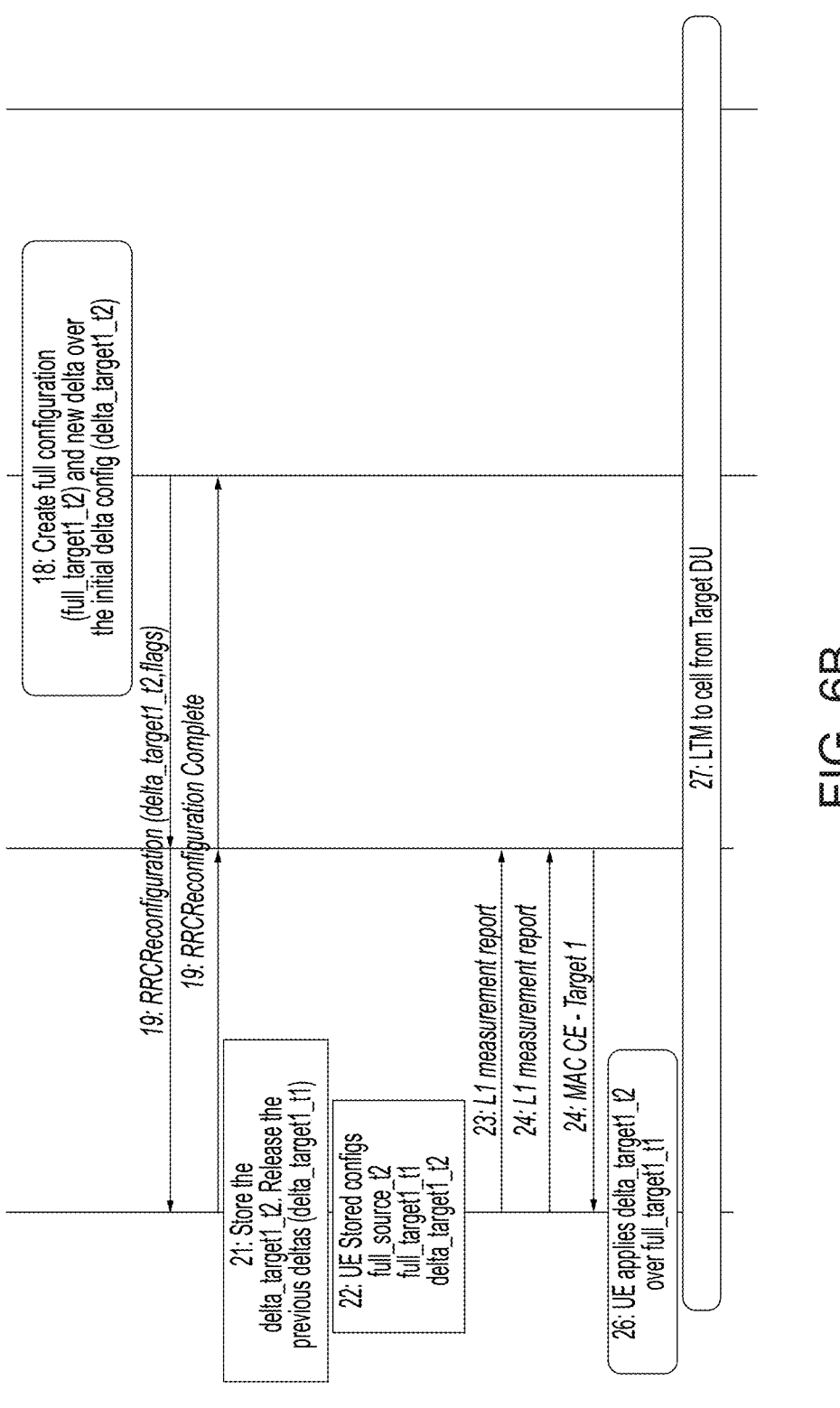

FIGS. 6A-6B illustrate an example implementation procedure to generate delta over target configurations in LTM considering initial full target cell configurations.

Handover Preparation Phase (t=1)

At Step 1, the UE has stored the full configuration of the current serving cell (full_source_t1).

At Steps 2 to 3, the UE, using the current RRC configuration provides L3 measurement reports to the serving CU, via the serving DU.

At Steps 4 to 6, the CU decides that it should prepare LTM and sends a UE context setup request to the target DUs. In these steps, the CU may coordinate with the serving DU as well using a UE context modification procedure to share the target cell configuration; this is however omitted from FIGS. 6A-6B.

At Step 7, the CU generates and stores the initial full target configurations.

At Steps 8 to 9, the RRC reconfigurations with the full configurations for LTM are sent to the UE and the UE sends the RRC configuration complete to the source CU (via the source DU).

At Step 10, the UE now stores the full source cell (full_source_t1) and the full target configuration (full_target1_t1).

Handover Evaluation Phase (Here t=2 (which is Later than t=1) but Also Valid for t=3, 4, . . . )

At Steps 11 to 12, the UE provides the L1 measurements to the source DU, which evaluates them.

At Step 13, the user plane configuration is updated, e.g., the PDU sessions are added/removed/modified, QoS flows are setup/terminated or the DRB configurations are modified.

At Step 14, because of the update at Step 13, the source cell configuration for the UE is updated (full_source_t2).

At Step 15-17, the CU sends a UE modification request to the target DUs with updated user plane configurations and receives a confirmation about the resources.

At Step 18, the CU creates a new full configuration internally. Then, the target CU create delta over target configuration (delta_target1_t2), which is the configuration with parameters representing the difference of the new full target configurations with the initial full target configurations.

At Steps 19 to 20, the CU sends the delta over target configurations and the indication flags via the RRC reconfigurations and gets the respective response.

At Step 21, the UE stores the delta over target configurations. In case there is a delta over target configuration from a previous step, the UE replaces the previous delta over target with the new ones. It will be appreciated that for t=2 there is no previous delta over target, in this case there is no replacement.

At Step 22, the UE now has the current full source configuration (full_source_t2) along with the initial delta over source configs (full_target1_t1, . . . , full_targetN_t1) and the latest delta over target configs (delta_target1_t2)

At Steps 23 to 27, the UE provides (as during the whole process) the L1 measurement reports. Once the serving DU decides to trigger the cell change it sends a MAC CE. The UE applies full_target1_t1 and on top delta_target1_t2. Then it performs cell change; note that this process may happen before the cell change triggering.

Table 6 below illustrates the stored source and target configurations and what the UE should do at the time of execution to get the target configurations.

TABLE 6

| UE Stored Source Config | UE Stored Target (candidate) Configs | At the time of execution |
|---|---|---|
| t1 {full_source_t1} | {full_target1_t1} | full_target1_t1 = full_target1_t1 |
| t2 {full_source_t2} | {full_target1_t1, delta_target1_t2} | full_target1_t2 = full_target1_t1 + delta_target1_t2 |
| t3 {full_source_t3} | {full_target1_t1, delta_target1_t3} | full_target1_t3 = full_target1_t1 + delta_target1_t3 |

It will be appreciated that in each of the embodiments set out above, the calculation and storage of the "delta over target" can be done by the source gNB. In this case, the target gNB needs to indicate the "delta over source" to the source gNB which can calculate the "delta over target" and signal this to the UE, along with an indication that it converted the delta configurations from "delta over source" to a "delta over target".

Also, for embodiments 1, 2 and 5, the reference for the initial delta can be the source configuration or any other reference configuration.

Furthermore, if the delta over target is null, i.e, there is no difference between the current target configuration and the initial configuration, then the source node can decide to skip the update, as the stored delta over target at the UE side is valid.

Configuration Comparisons

FIG. 7 illustrates example configurations before and after User Plane Reconfigurations. The "Delta over Target (compare full configs)" column represents embodiments 3 and 4 mentioned above, where the full configurations are used. The "Delta over Target (compare delta configs)" column represents embodiments 1 and 2 mentioned above. At t=2, QoS Flow 3 and DRB 3 are added and the target agrees with them. At t=3, QoS flows 2 and 3 and the corresponding DRBs are removed for both source and target nodes.

As can be seen, there are three tables representing the configurations at three timesteps, i.e., t=1, t=2, t=3. At t=1, the configurations are at the preparation phase and at t=2 and t=3, the configurations after a user plane reconfiguration are illustrated. The "Source Full Config" column are the source full configurations, the "Target Full Config" column are the target full configurations, the "Delta over source" column are the deltas between the current target and current source configuration (delta over source), the "Delta over Target (compare full configs)" column are the difference between the current full target config and the initial full config (embodiments 3 and 4), and the "Delta over Target (compare delta configs)" column are the differences between the current delta over source and the initial delta over source (embodiments 1 and 2). As can be seen, in the "Delta over source" column some parameters like PCI-2 and TCI-state-4-5-6 will persist, while in the "Delta over Target (compare full configs)" column the "Delta over Target (compare delta configs)" column those parameters are removed. Therefore, by using the delta over target, the repetitive parameters are not transmitted for every user plane reconfiguration. This advantage comes from the fact that the reference for these new types of deltas, are the target configurations themselves and not the source configurations.

Hence, it can be seen that methods are used to optimize the size of RRC Reconfiguration message. The method uses a delta over target configuration. The reference for the delta configurations are target configurations themselves. The delta over target configuration is a configuration that the target node #1 generates for each subsequent update. The delta over target configuration is generated by taking the difference of the currently-requested configuration with the initial configuration of target node #1 has stored. In a full configuration scenario, the delta over target configuration is generated calculating the difference of the currently-requested full target configuration with the initial full target configuration stored at the target node. The UE receives the delta over target configuration and stores it. To obtain the target full configuration, the delta is applied on the initial full configuration. In a delta configuration scenario, the delta over target configuration is generated calculating the difference of the currently requested target delta over source configuration with the initial target delta over source configuration stored at the target node. The UE receives the delta over target configuration and stores it. To obtain the target full configuration, the delta over source and delta over target is applied on the initial full configuration.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A user equipment of a telecommunications network comprising:

at least one processor; and at least one memory storing instructions that, when executed by the at least one processor, cause the user equipment at least to:

establish a connection between the user equipment and a first network node of the radio access network, the first network node supporting a first cell;

derive in the user equipment a reference configuration relating to the first cell, wherein the reference configuration includes information related to a first bearer configuration;

receive in the user equipment a target configuration related to a cell change from the first cell towards a second cell, wherein the target configuration includes information related to a target bearer configuration; and in response to an update of the first bearer configuration to an updated first bearer configuration, derive in the user equipment a related updated reference configuration and receive in the user equipment a delta-over-target configuration, the delta-over-target configuration including information related to differences between an updated target bearer configuration and the target bearer configuration.

2. The user equipment of claim 1, wherein the instructions cause the user equipment at least to:

receive an indication in the user equipment identifying the delta-over-target configuration.

3. The user equipment of claim 2, wherein the indication comprises a flag.

4. The user equipment of claim 1, wherein the instructions cause the user equipment at least to:

store in the user equipment the updated reference configuration, the target configuration and the delta-over-target configuration.

5. The user equipment of claim 1, wherein the reference configuration relates to a full configuration of the first cell at a first time when establishing connection with the first cell or a predetermined configuration known to the first network node and a second network node supporting the second cell.

6. The user equipment of claim 1, wherein the updated reference configuration relates to an updated full configuration of the first cell at a second time, subsequent to the first time, in response to the update of the first bearer configuration.

7. The user equipment of claim 1, wherein the instructions cause the user equipment at least to:

in response to a further update of the first bearer configuration of the first cell to a further updated first bearer configuration, derive in the user equipment a related updated reference configuration and receive in the user equipment an updated delta-over-target configuration, the updated delta-over-target configuration including information related to differences between the further updated target bearer configuration and the target bearer configuration.

8. The user equipment of claim 7, wherein the instructions cause the user equipment at least to:

store the updated delta-over-target configuration as the delta-over-target configuration.

9. The user equipment of claim 1, wherein the target configuration comprises a full configuration of the second cell.

10. The user equipment of claim 1, wherein the instructions cause the user equipment at least to:

determine a full configuration for performing the cell change towards the second cell by applying the delta-over-target configuration to the target configuration.

11. The user equipment of claim 1, wherein the target configuration comprises a delta-over-reference configuration, the delta-over-reference configuration including information related to differences between the target bearer configuration and the first bearer configuration.

12. The user equipment of claim 11, wherein the instructions cause the user equipment at least to:

determine a full configuration for performing the cell change towards the second cell by applying the delta-over-target configuration to the delta-over-reference configuration and to the reference configuration.

13. The user equipment of claim 1, wherein the instructions cause the user equipment at least to:

perform the cell change using the full configuration.

14. The user equipment of claim 1, wherein the instructions cause the user equipment at least to:

receive in the user equipment one or more further target configurations related to a cell change from the first cell towards one or more further cells, wherein the target configuration includes information related to a target bearer configuration of those further cells; and in response to an update of the first bearer configuration to the updated first bearer configuration, receive in the user equipment a delta-over-target configuration for the one or more cells, the delta-over-target configuration including information related to between the updated further target bearer configuration and the target bearer configuration.

15. The user equipment of claim 1, wherein the instructions cause the user equipment at least to:

receive the reference configuration, the target configuration, the delta-over-target configuration and/or the updated delta-over-target second delta configuration using RRC signalling.

16. The user equipment of claim 1, wherein the first bearer configuration, the target bearer configuration, the updated target bearer configuration and/or the further updated bearer first bearer configuration comprises information related to at least one of the following parameters: Data Radio Bearer parameters, Quality of Service parameters, Quality of Service flow parameters, Protocol Data Unit session parameter and/or other dynamically changing parameters, and the like.

17. The user equipment of claim 1, wherein the first network node comprises at least one of or supports functionality of at least one of: a base station, a 5G gNB, a Centralised Unit, a Distributed Unit, a secondary node, a source node or a source secondary node.

18. The user equipment of claim 1, wherein the user equipment supports dual connectivity to a master node and a secondary node.

19. The user equipment of any preceding claim 1, wherein the first cell is at least one of a source cell, a primary cell of a first cell group or primary cell of a secondary cell group supported by a source secondary node.

20. The user equipment of claim 1, wherein the second network node comprises at least one of or supports functionality of at least one of: a base station, a 5G gNB, a Centralised Unit, a Distributed Unit, a secondary node, a source node or a source secondary node.

21. The user equipment of claim 1, wherein the second cell is at least one of a target cell, a primary cell of a first cell group or primary cell of a secondary cell group supported by a first target secondary node.

22. The user equipment of claim 1, wherein the cell change from the first cell towards the second cell occurs as a result of Conditional Handover, Conditional PSCell Change and/or Lower Layer triggered Mobility.

23. A method for supporting cell change for a user equipment supporting connectivity towards a radio access network, the method comprising:

establishing a connection between the user equipment and a first network node of the radio access network, the first network node supporting a first cell, deriving in the user equipment a reference configuration relating to the first cell; wherein the reference configuration includes information related to a first bearer configuration;

receiving in the user equipment a target configuration related to a cell change from the first cell towards a second cell, wherein the target configuration includes information related to a target bearer configuration; and in response to an update of the first bearer configuration to an updated first bearer configuration, deriving in the user equipment a related updated reference configuration and receiving in the user equipment a delta-over-target configuration, the delta-over-target configuration including information related to differences between an updated target bearer configuration and the target bearer configuration.

24. A network node of a telecommunications network comprising:

at least one processor; and at least one memory storing instructions that, when executed by the at least one processor, cause the user equipment at least to:

transmit, from a first network node supporting a first cell to the user equipment, a target configuration related to a cell change from the first cell towards a second cell, wherein the target configuration includes information related to a target bearer configuration; and in response to an update of a first bearer configuration of the first cell to an updated first bearer configuration transmit, from the first network node to the user equipment, a delta-over-target configuration, the delta-over-target configuration including information related to between an updated bearer configuration and the target bearer configuration.

25. A method for supporting cell change for a user equipment supporting connectivity towards a radio access network, the method comprising:

transmitting, from a first network node supporting a first cell to the user equipment, a target configuration related to a cell change from the first cell towards a second cell, wherein the target configuration includes information related to a target bearer configuration; and in response to an update of a first bearer configuration of the first cell to an updated first bearer configuration transmitting, from the first network node to the user equipment, a delta-over-target configuration, the delta-over-target configuration including information related to between an updated bearer configuration and the target bearer configuration.

* * * * *